United States Patent
Patil et al.

(10) Patent No.: US 12,443,628 B2
(45) Date of Patent: Oct. 14, 2025

(54) SYSTEMS AND METHODS FOR MACHINE LEARNING MODELS FOR ENTITY RESOLUTION

(71) Applicant: Included Health, Inc., San Francisco, CA (US)

(72) Inventors: Jyotiwardhan Patil, San Francisco, CA (US); Eric Carlson, San Francisco, CA (US); Cole Leahy, San Francisco, CA (US); Bradley S. Tofel, San Francisco, CA (US); Vinay Goel, San Francisco, CA (US); Nicholas Gorski, San Francisco, CA (US)

(73) Assignee: Included Health, Inc., San Francisco, CA (US)

( * ) Notice: Subject to any disclaimer, the term of this patent is extended or adjusted under 35 U.S.C. 154(b) by 0 days.

(21) Appl. No.: 18/584,675

(22) Filed: Feb. 22, 2024

(65) Prior Publication Data

US 2024/0232236 A1 Jul. 11, 2024

Related U.S. Application Data

(63) Continuation of application No. 17/735,060, filed on May 2, 2022, now Pat. No. 11,921,758, which is a (Continued)

(51) Int. Cl.
*G06F 16/00* (2019.01)
*G06F 11/14* (2006.01)
(Continued)

(52) U.S. Cl.
CPC ........ *G06F 16/288* (2019.01); *G06F 11/1451* (2013.01); *G06F 16/1873* (2019.01);
(Continued)

(58) Field of Classification Search
CPC .. G06F 16/288; G06F 16/1873; G06F 16/258; G06F 16/2228; G06F 16/3338
(Continued)

(56) References Cited

U.S. PATENT DOCUMENTS

| | | | |
|---|---|---|---|
| 2011/0047167 A1* | 2/2011 | Caceres | G06Q 10/10 706/45 |
| 2012/0284259 A1* | 11/2012 | Jehuda | G06F 16/3338 707/769 |

(Continued)

*Primary Examiner* — Chelcie L Daye
(74) *Attorney, Agent, or Firm* — Finnegan, Henderson, Farabow, Garrett & Dunner LLP

(57) ABSTRACT

Methods, systems, and computer-readable media for linking multiple data entities. The method collects a snapshot of data from one or more data sources and converts it into a canonical representation of records expressing relationships between data elements in the records. The method next cleans the records to generate output data of entities by grouping chunks of records using a machine learning model. The method next ingests the output data of entities to generate a versioned data store of the entities and optimizes versioned data store for real-time data lookup. The method then receives a request for data pertaining to a real-world entity and presenting relevant data from the versioned data store of entities.

20 Claims, 12 Drawing Sheets

Related U.S. Application Data continuation of application No. 17/364,651, filed on Jun. 30, 2021, now Pat. No. 11,321,366.

(60) Provisional application No. 63/047,241, filed on Jul. 1, 2020.

(51) Int. Cl.
*G06F 16/18* (2019.01)
*G06F 16/22* (2019.01)
*G06F 16/25* (2019.01)
*G06F 16/28* (2019.01)
*G06N 20/00* (2019.01)

(52) U.S. Cl.
CPC ........ *G06F 16/2228* (2019.01); *G06F 16/258* (2019.01); *G06N 20/00* (2019.01); *G06F 2201/80* (2013.01); *G06F 2201/84* (2013.01)

(58) Field of Classification Search
USPC .................................................. 707/639, 769
See application file for complete search history.

(56) References Cited

U.S. PATENT DOCUMENTS

| | | | |
|---|---|---|---|
| 2013/0117232 | A1 | 5/2013 | Lee et al. |
| 2018/0330280 | A1* | 11/2018 | Erenrich ................. G06N 5/04 |
| 2020/0034462 | A1* | 1/2020 | Narayanasamy ... G06F 16/2228 |

* cited by examiner

```
[{
  "resourceType":
  "Patient",
  "id": "foo123",
  "gender": "male",
  "birthDate": "2017
  -09-05",                          — 252

"name": [                         — 253
    {
      "use":
      "official",
      "family":
      "Notsowell",
      "given":
      ["Simon"]
    }
  ], "address": [{                     — 254
    "use": "home",
    "type": "both",
    "text": "534 Erewhon St Pleasantville, Rainbow, Vic 3999",
    "line": ["534 Erewhon St"],
    "city":
    "Pleasantville",
    "district":
    "Rainbow",
    "state": "Vic",
    "postalCode":
    "3999",
    "period": {"start": "1974-12-25"}
  }]
}]                                  — 251
```

Fig. 2B

```
{
  "resourceType": "Patient",                                              — 256
  "id": "bar789",
  "gender": "male",
  "birthDate": "2017-09-05",
  "name": [                                                               — 257
    {                                                                     — 258
      "use": "official",
      "family": "Notsowell",
      "given": ["Simon"]
    },
    {                                                                     — 259
      "use": "official",
      "family": "Duck",
      "given": ["Donald", "D"]
    }
  ],
  "address": [{
    "use": "home",
    "type": "both",
    "text": "534 Erewhon St Pleasantville, Rainbow, Vic 3999",
    "line": ["534 Erewhon St"],
    "city": "Pleasantville",
    "district": "Rainbow",
    "state": "Vic",
    "postalCode": "3999",
    "period": {"start": "1974-12-25"}
  }]
}                                                                         — 255
```

Fig. 2C

SYSTEMS AND METHODS FOR MACHINE LEARNING MODELS FOR ENTITY RESOLUTION

CROSS-REFERENCE TO RELATED APPLICATIONS

This application is a continuation of U.S. Non-Provisional patent application Ser. No. 17/735,060, filed on May 2, 2022, which is a continuation of U.S. Non-Provisional patent application Ser. No. 17/364,651, filed on Jun. 30, 2021, which claims priority to U.S. Provisional Application No. 63/047,241, filed on Jul. 1, 2020, all of which are hereby incorporated by reference in their entireties.

BACKGROUND

An ever increasing amount of data and data sources are now available to researchers, analysts, organizational entities, and others. This influx of information allows for sophisticated analysis but, at the same time, presents many new challenges for sifting through the available data and data sources to locate the most relevant and useful information. As the use of technology continues to increase, so, too, will the availability of new data sources and information.

Because of the abundant availability of data from a vast number of data sources, determining the optimal values and sources for use presents a complicated problem difficult to overcome. Accurately utilizing the available data can require both a team of individuals possessing extensive domain expertise as well as many months of work to evaluate the outcomes. The process can involve exhaustively searching existing literature, publications, and other available data to identify and study relevant data sources that are available both privately and publicly.

While this approach can often provide effective academic analysis, applying these types of analytical techniques to domains requiring accurate results obtainable only through time and resource intensive research is incompatible with modern applications' demands. For example, the developed process for evaluating outcomes may not line up with specific circumstances or individual considerations. In this scenario, applying the process requires extrapolation to fit the specific circumstances, dilute the process's effectiveness, or require spending valuable time and resources to modify the process. As a result, processes developed in this way typically provide only generalized guidance insufficient for repurposing in other settings or by other users. As more detailed and individualized data becomes available, demand for the ability to accurately discern relevant data points from the sea of available information, and efficiently apply that data across thousands of personalized scenarios increases.

SUMMARY

Certain embodiments of the present disclosure relate to a non-transitory computer readable medium, including instructions that when executed by one or more processors cause a system to perform a method. The method may include collecting a snapshot of data from one or more data sources; converting the snapshot data into a canonical representation of records in the snapshot data, wherein the canonical representations of records express relationships between data elements in the records; cleaning the canonical representation of records to generate output data of entities, wherein the generation of the output data of entities includes grouping chunks of canonical representations of records representing real-world entities using a machine learning model; ingesting the output data of entities to generate a versioned data store of the entities; transforming the versioned data store of the entities into a format optimized for real-time data lookup; receiving a request for data pertaining to a real-world entity; and presenting relevant data from the versioned data store of entities by finding linkage between the identifying information of the real-world entity and entities in the versioned data store.

According to some disclosed embodiments, generation of the output data of entities may further include identifying one or more sets of data elements of the records forming one or more entity identifiers, wherein entity identifiers uniquely identify entities of a certain type of real-world entity; determining level of evidence of each entity identifier of the one or more entity identifiers in indicating a relationship between entities in the chunks of canonical representations of records representing the real-world entities grouping canonical representations of a chunk of records in the chunks of records, wherein grouping canonical representation of the chunk of records sharing entity identifier with highest level of evidence of the relationship between the chunk of records; and coalescing values of data elements of canonical representations of the chunk of records.

According to some disclosed embodiments, transforming the versioned data store of the entities into the format optimized for real-time data lookup may further include indexing entities using entity identifiers; applying blocking function to entities, wherein the entities are provided as an input parameter to the blocking function; indexing the entity identifiers under each blocking function, wherein the entity identifiers are generated by creating a mapping table including output of blocking function applied to entities and entity identifiers of the entities provided as parameters to the blocking function; and generating a versioned dataset with a table mapping entity identifiers to the corresponding entities; and persisting mapping tables and the version dataset.

According to some disclosed embodiments, receiving a request for data pertaining to the real-world entity may further include retrieving identification data of the real-world entity from the received request for data pertaining to the real-world entity; generating a request for an entity identifier associated with entity representing the real-world entity using the identification data of the real-world entity; determining the entity identifier associated with the entity, wherein the entity identifier uniquely identifies the entities of the output data; generating a request for a content bundle associated with the entity, wherein content bundle includes one or more entities of the output data with identifiers related to the entity identifier associated with entity representing the real-world entity; customizing the content bundle of the entity, wherein customization may include filtering entities; and returning the customized content bundle.

According to some disclosed embodiments, determining the entity identifier associated with the entity representing the real-world entity may further include transforming the received identification data to generate one or more keys mapping to entities in the output data; and sorting the one or more keys to identify a key associated with the identification data, wherein the key identifies entities related to received identification data.

According to some disclosed embodiments, the customizing the content bundle of the individual comprises pruning the content in the content bundle, wherein pruning is based on an application accessing the content bundle.

According to some disclosed embodiments, presenting relevant data from the versioned data store of entities may further include retrieving entity from the received request for data; cleaning entity by transforming entity to match canonical representation of the records in the output data of the entities; determining one or more blocking functions associated with a subset of entities of the output data of the entities; generating a mapping from blocking key values to the subset of entities, wherein blocking key values are generated by applying determined one or more blocking functions to the subset of entities; sorting blocking key values based on associated entity identifiers, wherein associated identifiers are entity identifiers of the subset of entities; determining entity identifiers based on blocking function key, wherein blocking function key identifies a blocking function, wherein the blocking function is part of the determined one or more blocking functions; retrieving entities in subset of entities based on the determined entity identifiers; determining match between retrieved entities and cleaned entity, wherein match identifies entity with relationship to cleaned entity; and determining entities from output data of entities based on matched entity.

According to some disclosed embodiments, determining entity based on blocking function key may further include selecting a blocking function key of one or more blocking functions keys, wherein the one or more blocking functions keys is part of the determined one or more blocking functions; and determining entity identifier associated with the selected blocking function key.

According to some disclosed embodiments, determining match between the retrieved entities and the cleaned entity may further include determining level of evidence of relationship between entity of the retrieved entities and the cleaned entity; and selecting entity with highest level of evidence of relationship to the cleaned entity.

According to some disclosed embodiments, ingesting the output data of entities to generate a versioned data store of the entities may further include determining version number associated with converting the snapshot data into the canonical representation of records; and attaching version number to a chunk of canonical representations of the canonical representations.

Certain embodiments of the present disclosure relate to a method performed for linking multiple data entities utilizing an entity resolution system. The method may include collecting a snapshot of data from one or more data sources; converting the snapshot data into a canonical representation of records in the snapshot data, wherein the canonical representations of records express relationships between data elements in the records; cleaning the canonical representation of records to generate output data of entities, wherein the generation of the output data of entities includes grouping chunks of canonical representations of records representing real-world entities using a machine learning model; ingesting the output data of entities to generate a versioned data store of the entities; transforming the versioned data store of the entities into a format optimized for real-time data lookup; receiving a request for data pertaining to a real-world entity; and presenting relevant data from the versioned data store of entities by finding linkage between the identifying information of the real-world entity and entities in the versioned data store.

Certain embodiments of the present disclosure relate to an entity resolution system for linking multiple data entities. The system includes one or more processors executing processor-executable instructions stored in one or more memory devices to perform a method. The method may include collecting a snapshot of data from one or more data sources; converting the snapshot data into a canonical representation of records in the snapshot data, wherein the canonical representations of records express relationships between data elements in the records; cleaning the canonical representation of records to generate output data of entities, wherein the generation of the output data of entities includes grouping chunks of canonical representations of records representing real-world entities using a machine learning model; ingesting the output data of entities to generate a versioned data store of the entities; transforming the versioned data store of the entities into a format optimized for real-time data lookup; receiving a request for data pertaining to a real-world entity; and presenting relevant data from the versioned data store of entities by finding linkage between the identifying information of the real-world entity and entities in the versioned data store.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 2B-C are exemplary JSON representations of linked entities, according to some embodiments of the present disclosure.

DETAILED DESCRIPTION

Figure 1:
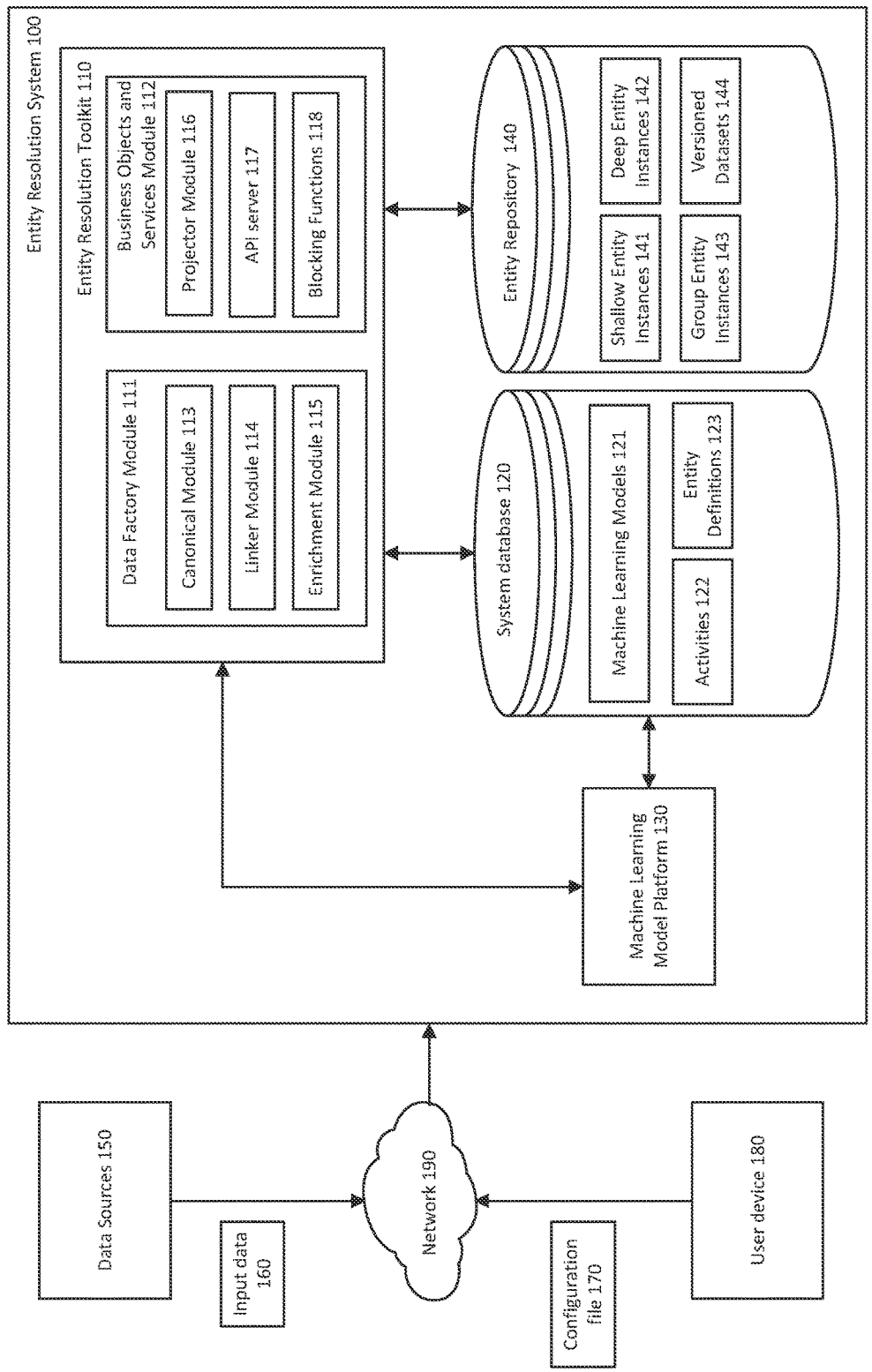
FIG. 1 is a block diagram showing various exemplary components of an entity resolution system for generating links between content of different data sources, according to some embodiments of the present disclosure.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for evaluating large numbers of data sources and vast amounts of data used in the creation of a machine learning model. These technologies can use information relevant to the specific domain and application of a machine learning model to prioritize potential data sources. Further, the technologies and techniques herein can interpret the available data sources and data to extract probabilities and outcomes associated with the machine learning model's specific domain and application. The described technologies can synthesize the data into a coherent machine learning model, that can be used to analyze and compare various paths or courses of action.

These technologies can efficiently evaluate data sources and data, prioritize their importance based on domain and circumstance specific needs, and provide effective and accurate predictions that can be used to evaluate potential courses of action. The technologies and methods allow for the application of data models to personalized circumstances. These methods and technologies allow for detailed evaluation that can improve decision making on a case-by-case basis. Further, these technologies can evaluate a system where the process for evaluating outcomes of data may be set up easily and repurposed by other uses of the technologies.

Technologies may utilize machine learning models to automate the process and predict responses without human intervention. The performance of such machine learning models is usually improved by providing more training data. A machine learning model's prediction quality is evaluated manually to determine if the machine learning model needs further training. Embodiments of these technologies described can help improve machine learning model predictions using the quality metrics of predictions requested by a user.

FIG. 1 is a block diagram showing various exemplary components of an entity resolution system for generating linked content of different data sources, according to some embodiments of the present disclosure. Linked content may include grouping data of same entity from different data sources and making non-obvious links between data from different data sources.

As illustrated in FIG. 1, entity resolution system 100 may include entity resolution toolkit 110 to help link data that pertain to a same entity. The entity may be any real-world entity defined in digital format using a set of fields called data elements. For example, the entity may be object instantiation of class definition in an object-oriented programming language (e.g., C++, Java, C#, etc.) representing any real-world entity, such as living beings, inanimate things, etc. Entity resolution toolkit 110 may link data by linking records associated with same entity from different data sources (e.g., data sources 150). In particular, entity resolution toolkit 110 may link data elements in records associated with same entity. Entity resolution system 100 may also include Machine Learning (ML) platform 130 to help determine the relationships between data elements in records associated with entities that in turn may be used to determine links between data elements of records associated with same entity. Entity resolution system 100 may store linked data in indexed format for fast real-time lookup of linked data of entities.

Entity resolution system 100 may be used for linking records and real-time lookup for a variety of data in various industries. For example, in a healthcare setting, there may be a multitude of data sources: ranging from claims and eligibility records to logs of mobile phone and web applications of insurance, doctors, and labs, and information about healthcare service providers (doctors, nurses, physician assistants, etc.) and healthcare facilities (hospitals, clinics, nursing homes, etc.).

Entity resolution system 100, after generating links between data elements, may help link records from data sources 150 and may be able to present longitudinal histories of entities latent in the data spread between data sources 150. Longitudinal histories of entities may help view data related to entities from even situations with no common identifier between entities. For example, in a healthcare setting, an entity that is a member of an insurance provider may be able to view all claims data (in a HIPAA-safe manner), regardless of whether the member entity has identified themselves in a way that exhibits an exact match with that data, such as claims from a current subscribed insurance provider. Entity resolution system 100 may extract, review, analyze and present latent information in longitudinal histories of entities based on applications communicating with entity resolution system 100. A set of example applications and use cases of longitudinal histories of entities are presented below.

In some embodiments, longitudinal history of activities of entities and real-time lookup may aid in searching relevant entities based on a history of activities of entities. For example, in a healthcare setting, an application may search relevant healthcare providers based on a user's claims history and other data that one may have about them from eligibility files, application access logs, etc. In some embodiments, applications of longitudinal history of one entity type may have use cases for other entity types. For example, in a healthcare setting, longitudinal histories generated from varied data sources with information about different types of entities may have applications for patients, providers (e.g., doctors), facilities (e.g., hospitals, testing labs), procedures (e.g., surgeries, physiotherapy, medication).

In some embodiments, entity resolution system 100 may review longitudinal histories of entities to identify a subset of entities to conduct specialized activities, such as to conduct outreach and marketing campaigns. For example, in a healthcare setting, an application connected to entity resolution system 100 may be provided based on its request of a cohort of member entities who have been identified as at risk, based on their histories, of experiencing alarming comorbidities or of being prescribed dangerous medications. Such identifications can help with specialized care and follow-up communication activities.

In some embodiments, longitudinal histories of one type of entities may be utilized for macro analysis of various entities associated with selected one type of entities. For example, in a healthcare setting, entity resolution system 100 may review histories of various patient type entities to be able to conduct epidemiological analysis of long-term effectiveness of certain procedures. In another scenario, entity resolution system 100 may analyze the impact of Machine Learning (ML) models of search service on patient type entities' activities when using the service and their well-being.

Other use cases of longitudinal histories determined by entity resolution system 100 may include classification of records of data from data sources 150. For example, in a healthcare setting, entities of service provider type may be classified whether they represent practitioners or facilities based on the records showing one individual or a group of individuals under one address. Another use case may include accurate, fine-grained reporting on return on investment for the companies investing in a service, such as a search service for finding service provider type entities.

Entity resolution system 100 may generate linkages between data elements of the varied set of data sources of data sources 150 that may concern the same entity using entity resolution toolkit 110. Entity resolution toolkit 110 may include data factory module 111 to help with linking entities from data sources 150. Data factory module 111 may have the capability to establish non-obvious linkages between data elements as presented in various application scenarios above.

Entity resolution toolkit 110 may achieve linkage between records from different data sources of data sources 150 associated with same entity using probabilistic matching of records. Entity resolution toolkit 110 may achieve probabilistic matching using Machine Learning (ML) models 121 in system database 120. ML models 121 may make non-obvious linkages between data from different sources. Data factory module 111 may utilize the non-obvious linkages generated by ML models 121 to generate a dataset of longitudinal histories of entities.

Existing systems link data representing entities solely based on common unique identifiers shared across data sources (e.g., data sources 150). Links based on common identifiers need pre-planning of structuring data in data sources. Such pre-planning will result in obvious links as planned by designers of such systems. ML models 121 may make non-obvious links that lack shared common unique identifiers. ML models 121 may generate links between records from different data sources of data sources 150 by identifying shared data elements between records associated with same entity. In some embodiments, a set of rules may determine the records associated with different entities that may be linked together. Entity resolution system 100 may receive rules for linking records as part of configuration file 170. Entity resolution system may apply different set of rules based on information in records associated with entities. For instance, entity resolution system 100 may have rules based on regulations with respect to access to data. For example, certain privacy and data protection regulations may result in limited and restrictive rules to link records associated with entities.

In some embodiments, ML models 121 may link records associated with different entities using shared data elements. For example, in a healthcare setting, a patient type entity may link to a healthcare provider type entity by reviewing records in claims database.

ML models 121 may determine a set of data elements of records from different data sources of data sources 150 that may uniquely identify records. In some embodiments, ML models 121 may uniquely identify records within a data source. A set of data elements uniquely identifying a record within a data source may not be sufficient to identify records in a different data source. ML models 121 may use a set of data elements of records to uniquely identify a type of entity of entities associated with records in data sources 150. For example, in a healthcare setting, ML models 121 may uniquely identify patient records in hospital case records based on patient's full name data element. But in a claims database, ML models 121 may uniquely identify patient records based on a patient's full name and address data elements. In some embodiments, each ML model in ML Models 121 may be trained to identify different entity types associated with records in data sources 150.

Probabilistic matching ML model of ML models 121 may be implemented using a graph algorithm for extracting the connected components of a graph. Graph algorithms utilized by probabilistic matching ML model of ML models 121 may generate a graph of linked records from different data sources of data sources 150 associated with same entity. Entity resolution system 100 may store graph of linked records from data sources 150 in a graph database, such as Amazon Neptune. Entity resolution toolkit 110 may store linked records associated with same entity type in entity repository 140. Entity resolution toolkit 110 may extract relevant entity information from linked records associated with entities before storing them in entity repository 140.

Entity resolution toolkit 110 may include data factory module 111 and Business Objects and Services (BOBS) module 112 to help extract data from various data sources (e.g., data sources 150) to generate linked information of each entity and, in turn, link records of data sources 150. Data factory module 111 may process data from data sources 150 to transform data from data sources 150 to generate input data used to generate links between data. Data factory module 111 may generate input data in an interoperable format to be used by other applications within entity resolution system 100 and external applications connected to entity resolution system 100. Data factory module 111 may aid in generation of input data used by other modules of entity resolution toolkit 110 to generate output data with links between entities. BOBS module 112 may help in processing output data for indexed storage for quick retrieval.

Data factory module 111 and BOBS module 112 may act independently of each other such that the output data generated by data factory module 111 may be used directly by other applications without BOBS indexing the output data. In some embodiments, applications may always access the latest linked entity data in output data and thus may not wait for BOBS module 112 to index the output data.

Data factory module 111 may generate input data for record linkage by capturing snapshots of input data (e.g., input data 160) from various data sources of data sources 150. Data factory module 111 may receive a snapshot of input data 160 from various data sources 150 at regular intervals. Entity resolution system 100 may provide ability to customize events to trigger data factory module 111 to capture and process snapshot of input data (e.g., input data 160). Data factory module 111 trigger events may include timers with set intervals, calls from applications to review linked entity data. In some embodiments, data factory module 111 may explicitly request data from various data sources of data sources 150 overriding any set event triggers to capture and process input data 160. Data factory module 111 may receive snapshot of input data 160 over network 190.

Data factory module 111 may use canonical module 113 along with linker module 114 for transmuting snapshot of input data into output data consumed by BOBS module 112.

In some embodiments, the output data may be consumed by other applications connected to entity resolution system 100.

Data factory module 111 may use an Extract, Transform, and Load (ETL) process to capture input data 160 from various data sources 150 and transform them into a uniform interoperable format. Data factory module 111 may store the captured snapshot of input data 160 in system database 120 as activities 122. In some embodiments, data factory module 111 may transform input data 160 to an interoperable format prior to storing it as activities 122 in system database 120.

Data factory module 111 may use industry standard formats to present entity instances to aid in interoperability. For example, Fast Healthcare Interoperability Resources (FHIR) data format may be used to represent input and transformed output by various software modules in data factory module 111. Data factory module 111 may use existing libraries for implementing data formatting, such as Google FHIR project to generate entity classes from FHIR's standard data structure definitions. Entity resolution system 100 may allow update data structure definitions with customization definitions. The customized definitions of interoperable data format of various entity types may be stored in system database 120. In some embodiments, customized definitions of different entity types may be present in entity definitions 123 to instantiate the entity type classes from the text-based snapshot data (e.g., input data 160).

Data factory module 111 transformation process may include standard cleaning procedures, such as ASCII-ization, removal of punctuation, etc. Data factory module 111 may use re-usable software libraries to help with cleanup of captured input data 160. Data factory module 111 may convert captured input data 160 into a canonical representation expressed in terms of relationships between various types of entities using canonical module 113.

Canonical module 113 may help express relationships between instances of different entity types. For example, in a healthcare setting, claims records input data from a claim database source may be converted into canonical representation (using canonical module 113) in which patient type entity may be related, through an explanation of benefit entity to location, healthcare provider, organization, and insurance coverage entities. Further, through insurance coverage entity, patient entity may link to insurance subscriber entity.

Canonical module 113 may generate and store canonical representations of entities as shallow entity instances 141 in entity repository 140. Canonical module 113 may store complete records as shallow entity instances or extract a set of data elements of each entity type and store them in shallow entity instances 141. Shallow entity instances 141 may format the complete record or set of data elements as vector fields mapping to at most one data element. In contrast, deep entity instances 142, as described below, may include vector fields that may contain more than one data element. A detailed discussion of vector fields and data elements in shallow and deep entity instances 141-142 are provided in FIGS. 2B-C descriptions below.

Canonical module 113 may identify different entity instances in snapshot of input data 160 obtained by data factory module 111. Canonical module 113 may identify the relationship between various entities using data elements of the instances of various entities. Canonical module 113 may generate interoperable representation of related entities and store them as shallow entity instances 141 in entity repository 140. Canonical module 113 may use entity definitions 123 in system database 120 to identify various entities present in cleaned up input data 160 provided by data factory module 111. Canonical module 113 may link and store identified entities as shallow entity instances 141. Canonical module 113 may link entities by reviewing shared data elements between different types of entities. In some embodiments, the relationship between two types of entities may be through a third type of entity.

Canonical module 113 may include multiple related entities in a single shallow entity instance of shallow entity instances 141. For example, in a health care setting, a visit by a patient to a hospital and the processed insurance claim may connect patient entity, healthcare provider entity, and insurance subscriber entity and store them together in a shallow entity instance of shallow entity instances 141.

Canonical module 113 may save a single record of input data 160 associated with multiple entity types as multiple shallow entity instances in shallow entity instances 141. In some embodiments, canonical module 113 may save to multiple shallow entity instances by splitting a record or making multiple copies of same data elements associated with different entity types in different shallow entity instances.

Data factory module 111 may include linker module 114 to help with linking records associated with one or more entities. Linker module 114 may group together shallow entity instances 141 representing different records in input data 160 captured by data factory module 111. Linker module 114 may process shallow entity instances 141 stored in entity repository 140 in batches. In some embodiments, canonical module 113 may generate shallow entity instances (e.g., shallow entity instances 141) and send them directly to linker module 114 for linking records by generating links between shallow entity instances 141.

Linker module 114 may define the grouping of shallow entity instances 141 by using labels defining relationship between instances of entities within a group. Linker module 114 may store the grouped shallow entity instances of shallow entity instances 141 as group entity instances 143. In some embodiments, linker module 114 may only store relationship information linking shallow entity instances of shallow entity instances 141 in group entity instances 143 and include references to shallow entity instances in shallow entity instances 141 having relationships.

Data factory module 111 may coalesce group entity instances 143 into deep linked data resources, such as deep entity instances 142. A detailed description of the process of grouping shallow entity instances 141 into group entity instances 143 is described in FIG. 2A description below.

In some embodiments, linker module 114 may use levels to describe relationships when grouping shallow entity instances of shallow entity instances 141. The levels may include text labels such as "weak" and "strong," showing the strength of the relationship between instances of entities. The levels of relationship may depend on data elements of entities. For example, an exact match on full SSN, full last name, and full date of birth together of individuals presented as entities may be considered as "strong" evidence. A match between other data elements may be considered as "weak" evidence that they belong to the same individual type entity. Collection of data elements used for finding relationships between shallow entity instances 141 are called entity identifiers of shallow entity instances. Identifiers forming strong and weak relationships between entities may be called fine and fine and coarse entity identifiers.

Entity resolution system 100 may define data elements considered for strong and weak evidence of relationship or other intermedial levels of relationship. Entity definitions 123 may include notations for describing relationship levels.

Notations in entity definitions 123 may include data elements to consider for finding relationships between entity instances from different sources. Entity definitions 143 may also include information to determine if related shallow entity instances of shallow entity instances represent the same instance.

ML models of ML models 121 may generate relationship information that may supersede the notions of relationship evidence defined in entity definitions 123. ML models 121 may help identify fine entity identifiers forming strong levels of relationship. Fine entity identifiers forming evidence of strong evidence of relationship may aid entity resolution system 100 to retrieve data related to entities with good precision and recall rates.

Enrichment module 115 may help transform snapshot of input data 160 captured by data factory module 111 into output data used by client applications to review information in linked records associated with an entity. Enrichment module 115 may use linker module 114 output to produce output data. Linker module 114 may directly provide the group entity instances 143 to generate output data. In some embodiments, enrichment module 115 may retrieve group entity instances 143 to generate output data. Enrichment module 115 may provide output data to BOBS module 112 to allow real-time access to data using API server 117. Enrichment module 115 may store output data as deep entity instances 142 in entity repository 140.

Enrichment module 115 may convert group entity instances 143 generated by linker module 114 into deep entity instances 142. Enrichment module 115 may create dataset objects called "coarse" and "fine," both containing deep entity instances with different extensions. "Coarse" and "Fine" data objects may include information from shallow entity instances of shallow entity instances 141 related to each other based on coarse and fine entity identifiers.

Enrichment module 115 may create a coarse dataset object by combining shallow entity instances of shallow entity instances 141 using identifiers (collection of data elements) that are a coarse level of evidence of relationship between shallow entity instances of shallow entity instances 141. Enrichment module 115 may convert data elements that are coarse level of evidence of relationship between entities into a string. Enrichment module 115 may coalesce each group entity instances of group entity instances 143 into a single deep entity instance of deep entity instances 142 by merging the vector fields of the shallow entity instances in group entity instances. Enrichment module 115 may apply tie-breaking heuristics in cases of conflict between values in fields. Conflicts between field values may arise when the values conflict. For example, in a healthcare setting, a claim entity instance and a hospital record entity instance of same patient type entity may include different data field values causing a conflict that may be resolved by enrichment module 115.

Enrichment module 115 may attach a proprietary extension to each coalesced deep entity instance. In some embodiment, enrichment module 115 may include a versioned attribute as part of the attached extension. Version attribute may be a value encapsulated by coarse identifier (of data elements) associated with a given group of entity instances of group entity instances 143. In some embodiments, version attribute may identify data factory execution timestamp or timestamp of snapshot of input data 160 captured by data factory module 111. For example, version attribute may be an object encapsulating a string such as 20210621 that may indicate the date on which data factory module 111 execution began to generate output data.

Enrichment module 115 may generate dataset of deep entity instances by coalescing group entity instances of group entity instances 143 using coarse entity identifiers. Enrichment module 115 may generate second dataset of deep entity instances by grouping entity instances based on fine identifiers associated with a group entity instances. Similar to coarse identifiers, fine identifiers may be presented as a stringified object of data element values in coalesced deep entity instances 142 to uniquely identify deep entity instances. Enrichment module 115, after coalescing group entity instances 143 associated with fine entity identifier, may include an extension associated with fine identifier of data elements. Dataset of deep entity instances coalesced using fine entity identifiers may also include a proprietary extension including a version attribute, as described above.

Deep entity instances of deep entity instances 142 generated by coalescing groups of shallow entity instances identified by coarse and fine identifiers may form part of the output data that may be supplied by data factory module 111 to BOBS module 112. Enrichment module 115 may store deep entity instances in entity repository 140 as deep entity instances 142 for use by BOBS module 112. In some embodiments, enrichment module 115 may directly transfer generated deep entity instances to BOBS module 112 and other internal data consumers.

In some embodiments, enrichment module 115 may produce complex dataset objects as part of output data. Enrichment module 115 may produce complex dataset objects of entities by re-linking generated deep entity instances to other deep entity instances. For example, in a healthcare setting, enrichment module 115 parsing group entity instances of claims data associated with patient type entities may result in deep entity instances of patient type entities linked to related deep entity instances of location type entities (e.g., hospitals and other facilities) and deep entity instances of healthcare provider type entities to form complex dataset objects of deep entity instances. Entity resolution system 100 may use such complex dataset objects of deep entity instances in presenting longitudinal histories of various entities.

Business Objects and Services (BOBS) module 112 may include projector module 116 and API server 117 to aid in storing and retrieving versioned deep entity instances 142 generated by enrichment module 115 of data factory module 111. Projector module 116 of BOBS module 112 may project dataset objects generated by enrichment module 115 to data store, such as entity repository 140 for access in real-time by services such as API server 117.

Linker module 114 may determine different entity identifiers for different runs of data factory module 111 capturing a different snapshot of input data (e.g., input data 160). Thus, an entity instance generated from input data extracted by data factory module 111 from today's run may not be associated with the same entity identifier values as an identical entity instance obtained from input data from a future run of data factory module 111. Thus, entity identifier values may be volatile. For this reason, entity resolution system 100 may minimize the leakage of entity identifiers. Entity resolution system 100 may include security measures to protect data leakage of entity identifiers beyond modules and applications in entity resolution toolkit 110. Entity resolution system 100 may secure entity identifiers identifying relationships between entity instances may be volatile as the relationships are based on a current snapshot of input data (e.g., input data 160) processed by data factory module 111.

Projector module 116 may be a batch-processing projection module, invoked after data factory module 111 has fully processed snapshot of input data 160 from various data sources 150. Projector module 116 may transform output data generated by data factory module 111 into a format optimized for real-time lookup.

API server 117 may be a real-time microservice that may handle data requests that require information identifying linkages between entity instances and the output data. For example, in a healthcare setting, API server 117 may handle requests, such as "get all claims pertaining to a patient entity," "tell me whether this identifier represents an eligible member entity of the insurance service" that may require linkages between information identifying a user and the output data generated by enrichment module 115.

Projector module 116 may ingest a dataset of deep entity instances of data entity instances 142 at once. Projector module 116 may process the ingested dataset of deep entity instances to generate a versioned dataset of versioned datasets 144 for each execution of data factory module 111 and its components 113-115. Projector module 116 may store versioned datasets 144 as read-only data in entity repository 140. Projector module 116 may archive or delete datasets of versioned datasets 144 using a sliding window of most recent execution of data factory module 111. In some embodiments, versioned datasets of versioned datasets 144 outside the sliding window may still be maintained to manage certain API calls sent to API server 117. For example, an older version of API may be used by a client application and may require an older format of dataset of versioned datasets 144 that is outside of the sliding window used to manage versioned datasets 144.

Projector module 116 may connect deep entity instances 142 to generate versioned datasets 144. In some embodiments, projector module 116 may take the version attribute in extensions attached to deep entity instances 142 to generate versioned datasets. In some embodiments, projector module 116 may include only one deep entity instance of deep entity instances 142 in each versioned dataset. A detailed description of how projector module 116 may connect entity instances is presented in FIG. 3 description below.

API server 117 may be a microservice that may store projections of output data generated by projector module 116 for optimizing query performance. API server 117 may store data in a format to optimize query performance for entity data in entity repository 140. API server 117 may include multiple endpoints for conducting various services exposed as API to external and internal clients of entity resolution system 100. API server 117's endpoints may be invoked by another data server (e.g., Formatting server 480 of FIG. 4).

API server 117 may receive calls to API endpoints as HTTP method calls using RESTful pattern of communication. In some embodiments, API server 117 may expose API endpoints to be called using query languages such as GraphQL. API server 117 may use GraphQL queries to retrieve data stored graph format by entity resolution system 100 in entity repository 140. API server 117 may retrieve multiple disparate resources, such as entities in entity repository 140 based on GraphQL queries. API server 117 responding to GraphQL queries may need to customize the return values by forming links between different entities in entity repository 140. A detailed description of customization of bundle of entities is provided in FIG. 9 description below.

API server 117's endpoints may include a "resolve endpoint" to help retrieve entity data stored in entity repository 140. API server 117 may help retrieve versioned datasets (e.g., versioned datasets 144) of entities indexed using coarse and fine identifiers. API server 117 may expose a resolve endpoint for each entity type as identified by entity resolution toolkit 100. In some embodiments, API server 117 may review entity definitions 123 to determine various possible types of entities. In some embodiments, API server 117 may expose different resolve endpoints for coarse and fine identifiers associated with the same entity.

API server 117 may expose different endpoints for accessing different versioned datasets 144. In some embodiments, API server 117 resolve endpoints may request for version number as a query parameter to retrieve the correct dataset of versioned datasets 144. API server 117's resolve endpoint may request other query parameters such as type of entity identifier (e.g., coarse or fine) to search in versioned datasets 144. API server 117 may define default values for different types of entity identifiers and version numbers. In some embodiments, API server 117 may consider the latest version number as the default value when searching versioned datasets 144.

API server 117, after receipt of a request at a registered resolve endpoint, may result in returning a dataset with an empty collection of entity instances. API server 117 may retrieve entity instances from entity repository 140 by matching the provided version value and entity identifier (coarse or fine) to entity instances in a versioned dataset of versioned datasets 144. API server 117 may reach an unbreakable tie if there is more than one dataset matching the input data received at the endpoint of API server 117. API server 117 may receive entity identifying information in an interoperable format, such as JSON representation similar to the transformed records by canonical module 113 described above.

In some embodiments, API server 117 may not receive the actual entity identifier used to index entity data (e.g., versioned datasets 144). API server 117 may receive data elements that may need to be mapped to an identifier to uniquely identify entity instances. For example, API server 117's resolve endpoint may receive a shallow entity instance along with the type of entity identifier (e.g., coarse or fine) and version number of the data factory module 111 run. In this scenario, a client may make a POST HTTP request method call to API server 117's resolve endpoint with shallow entity instance represented in JSON format in the body of POST HTTP method call. API server 117 may review POST HTTP method call and may return a possible collection of versioned dataset values indexed by provided entity identifier. API server 117 may return values by matching the given shallow entity instance against output data present in deep entity instances 142. A detailed description of an exemplary method used by API server 117 to match shallow entity instances to retrieve deep entity instances is presented in FIG. 9 description below.

In some embodiments, API server 117 may include "crosswalk" endpoint to help convert an entity identifier (coarse or fine) from one version to another. The conversion may help in linking entity data from different versions to link data for exploration purposes and extract longitudinal histories.

In various embodiments, system database 120, entity repository 140, and data sources 150 may take several different forms. For example, entity repository 140 may be an SQL database or NoSQL database, such as those developed by MICROSOFT™, REDIS, ORACLE™, CASSAN- DRA, MYSQL, various other types of databases, data returned by calling a web service, data returned by calling a computational function, sensor data, IoT devices, or various other data sources. System database 120 may store data that is used during the operation of applications, such as data factory module 111. For example, if data factory module 111 is configured to generate output data of entities, then data factory module 111 may access entity definitions 123 to produce shallow entity instances 141 using entity definitions 123. Similarly, if a client application is configured to provide deep entity instances 142, API server 117 may retrieve previously generated deep entity instances 142 and other related data stored in entity repository 140 as version datasets 144. In some embodiments, system database 120 and entity repository 140 may be fed data from an external source, or the external source (e.g., server, database, sensors, IoT devices, etc.) may be a replacement. In some embodiments, system database 120 may be data storage for a distributed data processing system (e.g., Hadoop Distributed File System, Google File System, ClusterFS, and/or OneFS). Depending on the specific embodiment of entity repository 140, API server 117 may optimize the entity data for storing and retrieving in entity repository 140 for optimal query performance.

Configuration file 170 may provide definitions of entities by listing the field names and other names to use as filter criteria in extracting values for field names from snapshot of input data 1780 captured by entity resolution system 100. Configuration file 170 may be presented as name-value pairs used to define the entities requested by a user of user device 180. Entity resolution system 100 may parse configuration file 170 to generate and store entity definitions 123. Configuration file 170 may include definitions of trigger events to capture snapshot of input data (e.g., input data 160) from data sources 150. In some embodiments, configuration file 170 may also include definitions of coarse and fine entity identifiers and other levels of evidence of relationships between entity instances. Configuration file 170 may also include default values for coarse and fine entity identifiers and version attribute associated with versioned datasets 144. Entity resolution system 100 may receive configuration file 170 from user device 180 over network 190.

Entity resolution system 100 may include a defined structure for configuration file 170, such as YAML. Structured files such as YAML files may help in defining and finding relationships between entities with no custom software code. Entity resolution system 100 may parse configuration file 170 in YAML format to generate entity definitions stored as entity definitions 123. In some embodiments, configuration file may be formatted using other programming languages notations such as JSON or using tools such as Protobuf to generate text-based files. In some embodiments, the generated configuration files are human readable text in using ASCII character set.

Entity resolution system 100 may provide a graphical user interface to define entities and levels of evidence of matching entities and generate a configuration file (e.g., configuration file 170). In some embodiments, entity resolution system 100 may provide various definitions of entities previously defined by a user in a dropdown UI. A user may generate a configuration file by selecting data elements of each type of entities using a GUI. In some embodiments, entity resolution system 100 may allow editing format of entity classes, such as identifiers that may uniquely identify shallow entity instances 141. Entity resolution system 100 may also include the ability to store the revised entity definitions 123 in system database 120. The use of structured languages such as YAML to format configuration files and repurposing entity definitions using a GUI may help standardize entity definitions and portability of requests for matching entities across various applications.

Network 190 may take various forms. For example, network 190 may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, network 190 may include an on-premises (e.g., LAN) network, while in other embodiments, network 190 may include a virtualized (e.g., AWS™, Azure™, IBM Cloud™ etc.) network. Further, network 190 may in some embodiments be a hybrid on-premises and virtualized network, including components of both types of network architecture.

Figure 2A:
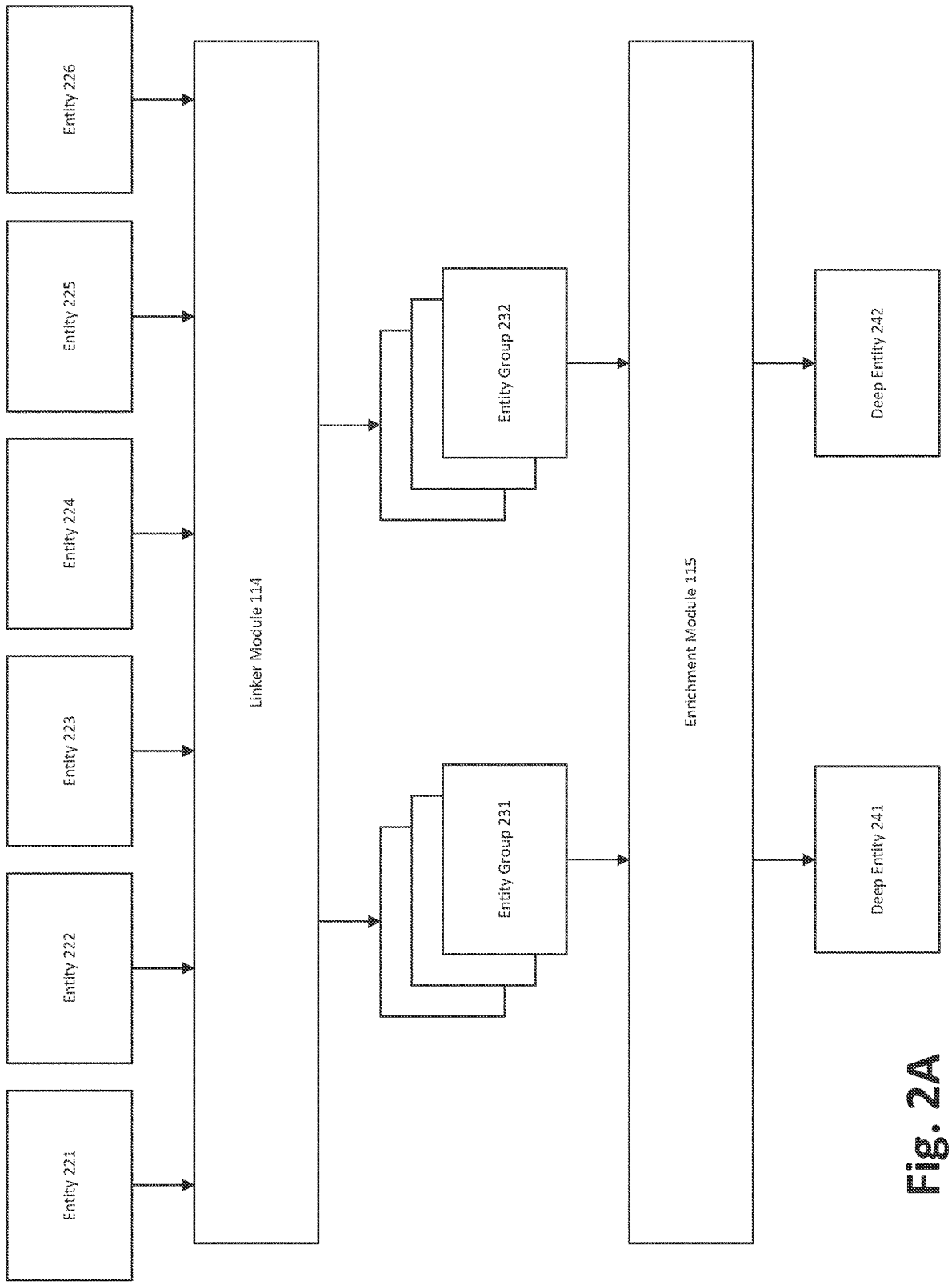
FIG. 2A is a flow diagram showing various exemplary transformations involved in generating deep linked entities, according to some embodiments of the present disclosure.

FIG. 2A is a flow diagram showing various exemplary transformations involved in generating deep linked entities, according to some embodiments of the present disclosure. Modules in entity resolution toolkit 110 may work on various types of entities identified from snapshot of input data 160 retrieved from data sources 150 to generate deep entity instances 142 with relation links to different types of entities.

As illustrated in FIG. 2A, linker module 114 and enrichment module 115 may together help generate output data of linked entities. Linker module 114 may take as input a set of entity instances 221-226 to help identify relationships between entities. Linker module 114, after identifying relationships between entity instances 221-226, may group them to form group entity instances 231-232. Linker module 114 may present coarse entity identifier and fine entity identifier helping match group of entities prior to generating group entity instances 231-232. Entity instances 221-226 may be part of multiple groups based on entity identifiers finding matching entity instances. Linker module 114 may review data elements of entity instances 221-226 to identify set of data elements to use as entity identifiers to uniquely identify entity instances.

Enrichment module 115 may take group entity instances 231-232 as input to generate output data in the form of deep entity instances 241-242. Enrichment module 115 may review group entity instances 231-232 to determine types of entity identifiers associated with group of entity identifiers. Enrichment module 115 may pick group entity instances that may include a fine entity identifier indicating strong level of evidence of relationship between entity instances of group entity instance to generate deep entity instances. Enrichment module 115 may generate deep entity instances 241-242 by coalescing data elements in group entity instances 231-232. Enrichment module 115 may use tie-breaking heuristics if entity instances in group entity instances 231-232 include data elements with conflicting values. Enrichment module 115 may attach the fine entity identifier to generated deep entity instances. Enrichment module 115 may request data factory module 111 to provide version number to attach to the generated deep entity instances 241-242. Enrichment module 115 may store deep entity instances 241 and 242 as deep entity instances 142 (as shown in FIG. 1) in entity repository 140 (as shown in FIG. 1). In some embodiments, enrichment module 115 may provide deep entity instances 241-242 as input to projector module 116 (as shown in FIG.

1) to generate versioned datasets (e.g., versioned datasets 144 of FIG. 1) for quick and easy lookup of entity information.

FIGS. 2B-C are exemplary JSON representations of linked entities, according to some embodiments of the present disclosure. Data factory module 111 (as shown in FIG. 1) may extract snapshot of input data (e.g., input data 160 of FIG. 1) of entities from various resources (e.g., data sources 150 of FIG. 1) and transform them to interoperable formatted data. For example, in a healthcare setting, data factory module 111 may get a snapshot of data and transform it into interoperable Fast Healthcare Interoperability Resources (FHIR). FHIR structured data may use JSON syntax for interoperability purposes. Entity resolution system 100 (as shown in FIG. 1) may define the syntax for formatting input data (e.g., input data 160 of FIG. 1) interoperable datasets of entities. In some embodiments, entity resolution system 100 may use an industry standard data format, such as FHIR. Entity resolution system 100 may customize industry standard data format to include additional vector fields. Data factory module 111 may transform received input data 160 into hierarchical key-value pairs called data elements using JSON syntax, as shown in FIGS. 2B-C.

FIG. 2B presents an example shallow entity instance 251 with only one data element at all levels. As illustrated in FIG. 2B, shallow entity instance 251 may represent a patient type entity instance with different vector fields 252-254, including only one element at any level. Shallow entity instance 251 may include simpler vector fields 252 and complex vector fields 253-254 with multiple internal fields.

FIG. 2C presents an example deep entity instance 255 generated by entity resolution toolkit 110 as part of generating longitudinal histories associated with various entity types. Entity resolution toolkit 110 may use shallow entity instances such as shallow entity instance 251 (as shown in FIG. 2B) to generate deep entity instances. Deep entity instance 255 may include multiple data elements at various levels. As illustrated in FIG. 2C, deep entity instance 255 may include vector fields with both single data elements and multiple data elements, such as vector fields 256 and 257, respectively. Deep entity instance 255 may include vector fields with multiple data elements either for simple vector fields or complex vector fields. For example, vector field 257 includes two elements that are complex vector fields themselves. Values of complex vector fields such as vector field 256 may include within them shallow entity instances, such as 258-259. Entity resolution toolkit 110 (as shown in FIG. 1) may transform shallow entities, such as shallow entity instance 251, to generate deep entity instances.

Figure 3:
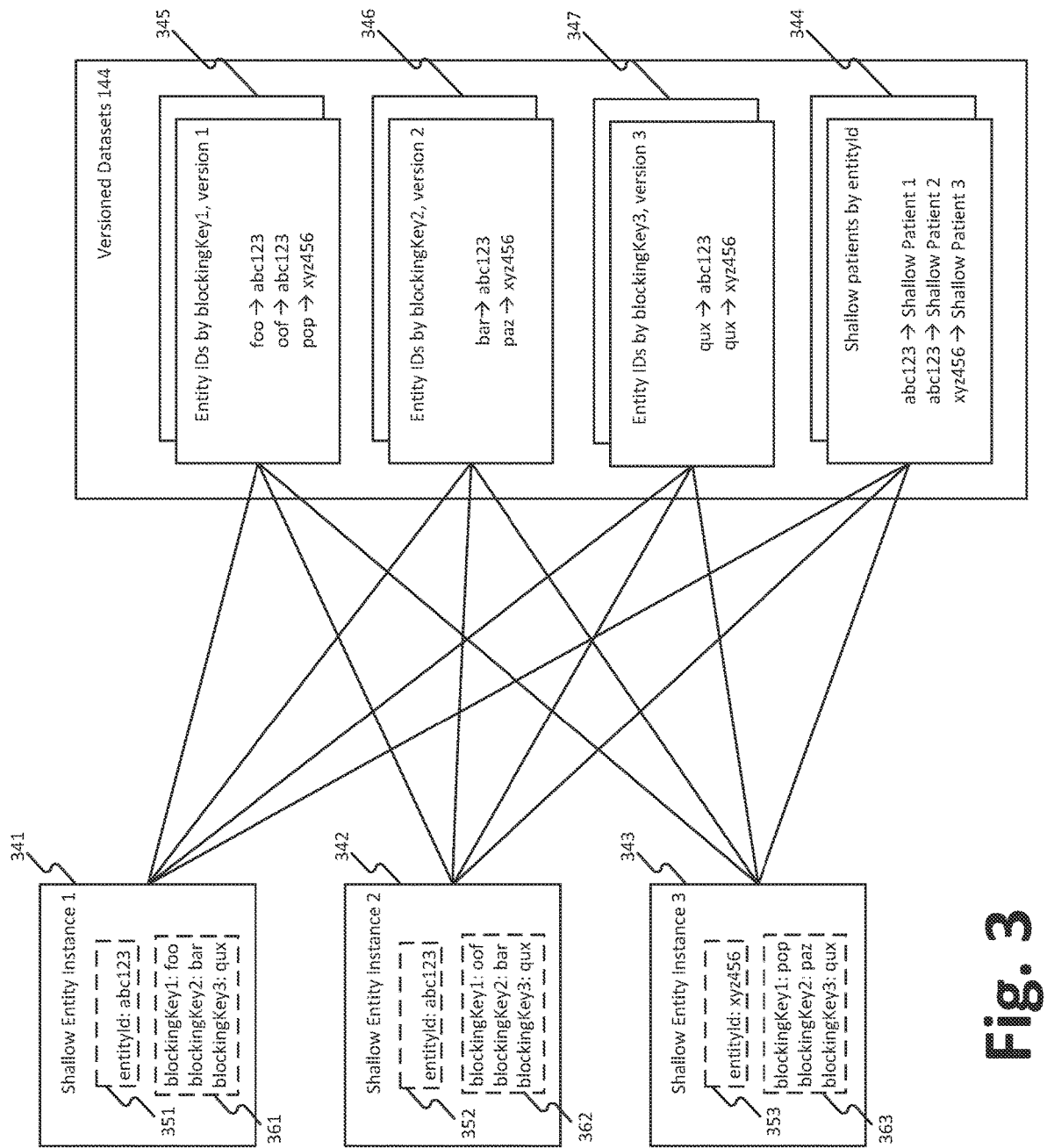
FIG. 3 is a diagram showing exemplary content projections involved in generation of versioned datasets of entities, according to some embodiments of the present disclosure.

FIG. 3 is a diagram showing exemplary content projections involved in generation of versioned datasets of entities, according to some embodiments of the present disclosure. As illustrated in FIG. 3, shallow entity instances 341-343 may be projected to form versioned dataset 344 in versioned datasets 144 (as shown in FIG. 1) with shallow entity instances 341-343 linked using entity identifiers "abc123" and "xyz456." Versioned datasets 144 may also include mapping tables (e.g., Mapping tables 345-347) to determine entity identifiers that may be used to find entity instances. Mapping tables 345-347 may help in real-time lookup of relevant entity data in shallow entity instances 141 (as shown in FIG. 1) and deep entity instances 142 (as shown in FIG. 1). Projector module 116 (as shown in FIG. 1) may index mapping tables 345-347 by blocking function keys and version numbers. Projector Module 116 and API server 117 (as shown in FIG. 1) may use blocking function keys to identify blocking functions used to generate blocking function key values stored in mapping tables 345-347. Version numbers may represent the version of data factory module 111 (as shown in FIG. 1) run performed to transform snapshot of input data to output data. Projector module 116 may retrieve version numbers from version attribute in extensions associated with deep entity instances 142. In some embodiments, mapping tables 345-347 may be saved separately in entity repository 140 outside of versioned datasets.

Projector module 116 may retrieve shallow entity instances 341-343 from shallow entity instances 141 to generate versioned dataset 344 and store in versioned datasets 144. Projector module 116 may generate a similar mapping between version datasets for deep entity instances 142.

As illustrated in FIG. 3, shallow entity instances 341-345 may be indexed by entity identifiers 351-353. Shallow entity instances 341-343 may be associated with coarse identifiers, which may indicate a coarse level of evidence of relationship between shallow entity instances with matching entity identifiers. For example, shallow entity instances 341 and 342 may be considered to have matching entity identifiers 351 and 352 with the same value, "abc123," which may indicate that the two entity instances may be related with a weak level of evidence. Projector module 116 may use blocking functions 118 (as shown in FIG. 1) to generate sets of blocking function key-value mappings 361-363. Projector module 116 may apply the same set of blocking functions of blocking functions 118 to different shallow entity instances (e.g., shallow entity instances 341-343). Blocking functions 118 upon applying to entity instances, such as shallow entity instances 341-343, may result in generating an output string. Blocking functions 118 may generate a string of entity instances by using a function, such as a stringify function provided by various programming languages. Projector module 116 may apply blocking functions 118 on entity instances presented as a data object or a set of data elements that are fields in entity instances presented as data objects. A detailed description of how mapping tables 345-347 and their indices are used in real-time lookup of entity data is presented in FIG. 10 description below.

Figure 4:
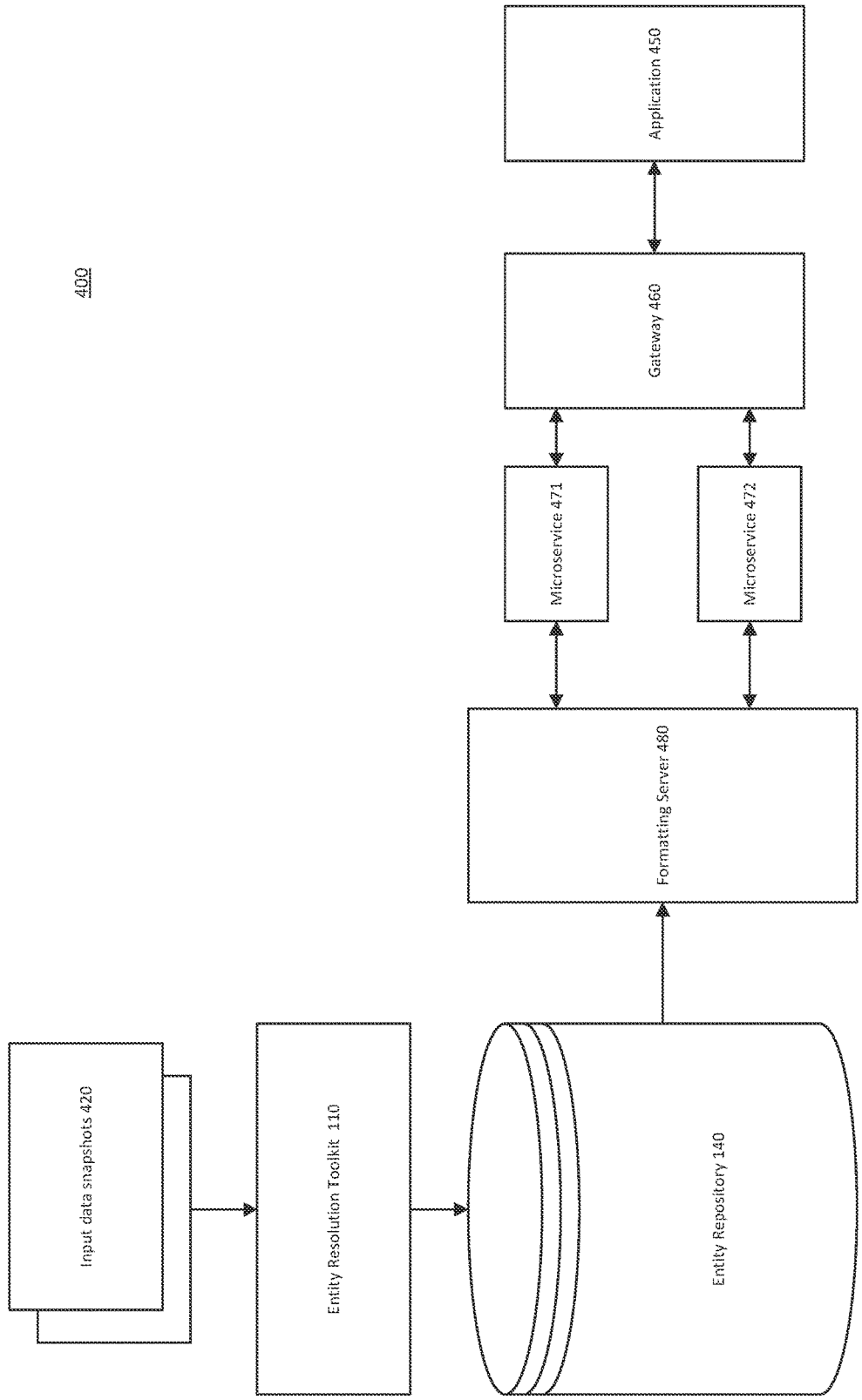
FIG. 4 is a block diagram showing various exemplary components for activity log system using deep linked entities generated by entity resolution system of FIG. 1, according to some embodiments of the present disclosure.

FIG. 4 is a block diagram showing various exemplary components for activity log system 400 using deep entity instances generated by entity resolution system of FIG. 1, according to some embodiments of the present disclosure. Activity log system 400 may help retrieve activities associated with a certain entity to generate an activity feed. For example, in a healthcare setting, activity log system 400 may help retrieve claims associated with a patient or member of an insurance provider to generate claims activity feed.

Activity log system 400 may access activity feed and present longitudinal history of activities of entities in entity repository 140 (as shown in FIG. 1). Activity log system 400 may be a micro service (e.g., microservices 471-472) on top of entity resolution system 100. In some embodiments, activity log system 400 may be a data pipeline for transforming input data (e.g., input data snapshots 420) into a standardized format, such as FHIR. Activity log system 400 may utilize entity resolution toolkit 110 to group and merge entities that may pertain to the same real-world entity.

As illustrated in FIG. 4, activity log system 400 may include application 450 communicating with entity repository 140 to retrieve a set of related entities representing activities associated with one entity requested by a user (not shown in the figure) of application 450. Activity log system 400 may include intermediaries, such as gateway 460, microservices 471-472, and formatting server 480 to help retrieve activity data of entities in entity repository 140 in real-time. In some embodiments, application 450 may directly communicate with entity repository 140 or through endpoints exposed by API server 117 (as shown in FIG. 1).

Microservices 471-472 may be different activity feeds of different sets of entities accessed by application 450. Microservices 471-472 may serve different applications accessing activity feeds of entities (e.g., deep entity instances 142 of FIG. 1). In some embodiments, microservices 471-472 may be identical copies executing on different computing devices to support the activity feed request traffic.

Gateway 460 may aid in distributing requests from applications, such as application 450 to microservices 471-472. Gateway 460 may analyze the endpoint called for activity feed by application 450 to determine the appropriate microservice of microservices 471-472. In some embodiments, gateway 460 may manage input traffic for activity feed requests and distribute them to microservices 471-472.

Microservices 471-472 may pass the request for activity feed to formatting server 480 to format data to present in a format suited for requesting application, such as application 450. In some embodiments, formatting server may work in a batch manner pre-format data and store in entity repository 140, such as canonical module 113 (as shown in FIG. 1) transforming input data (e.g., input data 160 of FIG. 1) into an interoperable format to be used other modules of entity resolution system 100 and other external applications. Application 450 may provide formatting details as part of activity feed request. Formatting server 480 may use the provided formatting details to format the activity feed of entities retrieved from entity repository 140. In some embodiments, formatting server 480 may prune entity information retrieved from entity repository 140. For example, formatting server 480 may paginate activity feed information and send a subset of entity activities accessed from entity repository 140. In some embodiments, formatting server 480 may be part of API server 117 exposing endpoints as microservices 471-472.

Figure 5:
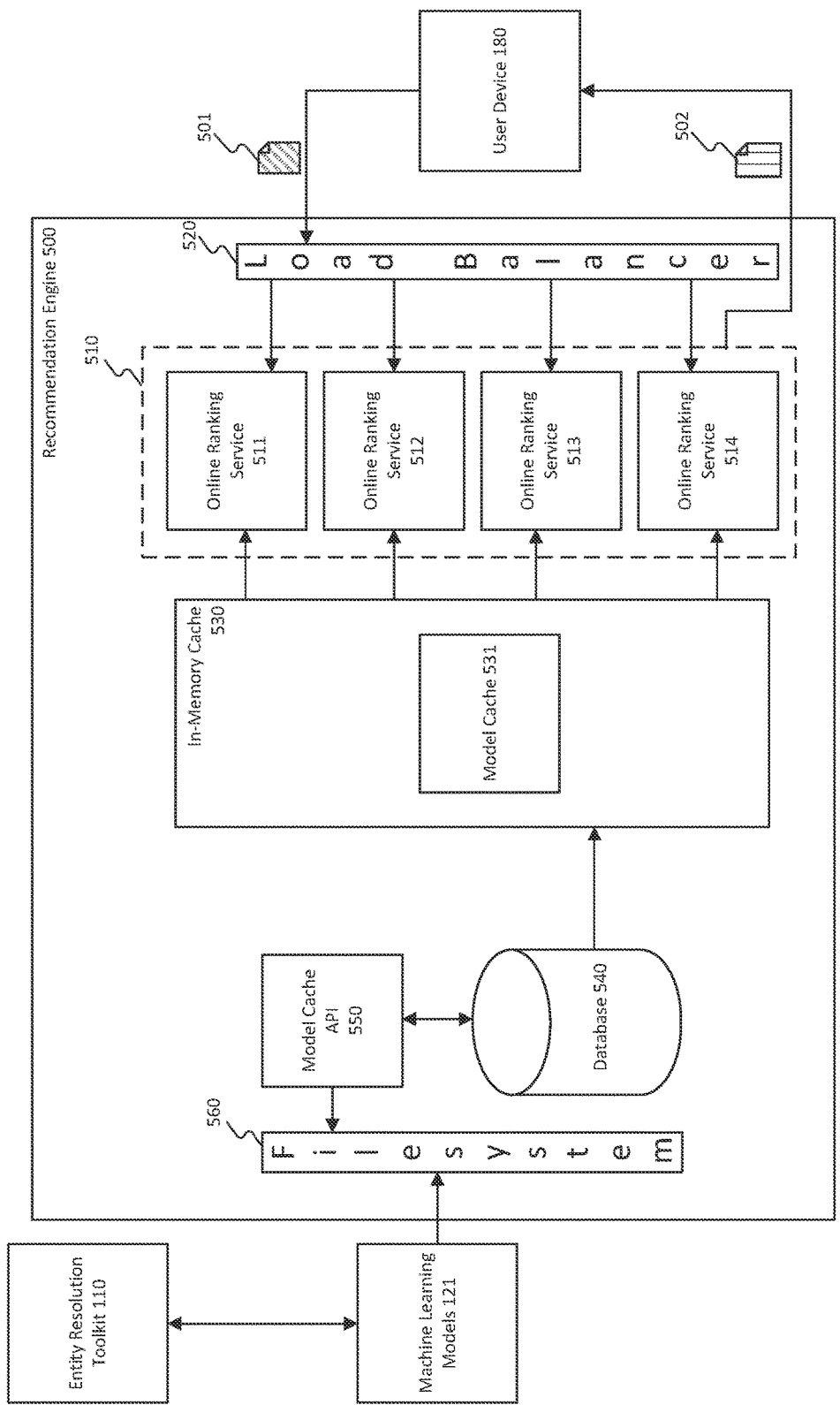
FIG. 5 is a block diagram of an exemplary recommendation engine, according to some embodiments of the present disclosure.

FIG. 5 is a block diagram of an exemplary recommendation engine 500, according to some embodiments of the present disclosure. As illustrated in FIG. 5, the internals of a recommendation engine 500, which includes an online ranking service 510, may help in preparing a recommended list of service providers in response to query 501 and resolved entity links identified by entity resolution system 100 (as shown in FIG. 1). Recommendation engine 500 may review longitudinal histories of entity resolution system 100 in determining appropriate service providers for user querying recommendation engine 500 for service providers. Preparation of list of service providers 502 may include ordered listing and grouping of service providers.

As illustrated in FIG. 5, recommendation engine 500 may comprise the online ranking service 510 to help determine the ranked order of the service providers to be part of a list of service providers 502 shared with a user. The online ranking service 510 may be replicated multiple times across multiple computers of a cloud computing service (not shown in the figure). The multiple instances 511-514 of online ranking service 510 may help with handling multiple users' queries simultaneously. Entity resolution system 100 (not shown in the figure) may receive query 501 and may delegate the online ranking service 510 to help determine the recommended list of service providers 502.

The recommendation engine 500 may also include a load balancer 520 to manage load of users' queries sent to the online ranking service 510. Load balancer 520 may manage the users' query load by algorithmically selecting an online ranking service instance of online ranking service instances 511-514. For example, load balancer 520 may receive query 501 from user device 180 and forward it to online ranking service instance 511. In some embodiments, load balancer 520 may go through a round-robin process to forward the user queries to online ranking service instances 511-514. In some embodiments, online ranking service instances 511-514 may each handle different types of user queries. The type of query may be determined by load balancer 520.

The ranking method followed by online ranking service 510 may depend on the determined type of query 501. In some embodiments, the ranked results generated by a set of online ranking service instances may be combined together by another set of online ranking service instances. For example, an online ranking service instance may rank based on the quality of healthcare provided, and another instance may rank based on the efficiency of the health care provider, and a third online ranking service may create composite ranks based on the ranking of service providers based on quality and efficiency.

Online ranking service 510 may utilize ML models to rank service providers. The online ranking service 510 may obtain the service providers through a set of ML models in ML models 121 and then rank them using another set of ML models in ML models 121. The ML models used for processing the identified service providers may reside in in-memory cache 530 for quick access. The ML models in in-memory cache 530 may be pre-selected or identified based on query 501 sent by a user. Recommendation engine 500 may include a model cache 531 to manage the ML models in the in-memory cache 530. In some embodiments, the model cache 531 may manage the models by maintaining a lookup table for different types of ML models. The model cache 531 may maintain and generate statistics about the ML models in in-memory cache 530. In some embodiments, the model cache 531 may only manage copies of models upon a user request. The model cache 531 may only include a single copy of each model in the in-memory cache 530. In some embodiments, the model cache 531 may also include multiple instances of the same ML models trained with different sets of data present in the database 540.

Entity resolution toolkit 110 may train ML models in ML models 121 before using them in recommendation engine 500 to generate a recommended list of service providers 302. Entity resolution toolkit 110 may train ML models based on entity data requested by a user using user device 180, as described in FIG. 1 description. Recommendation engine 500 may use ML models of ML models 121 trained using entity resolution toolkit 110 to identify a set of linked entities that can form recommended list of service providers. For example, related entities representing service providers associated with an entity may be used to recommend to another user's search for similar services.

ML models in the in-memory cache 530 may be regularly copied from a key-value pair database 540 containing the trained ML models of ML models 121. Database 540 may access ML models in the ML models 121 using a model cache API 550. In some embodiments, the ML models 121 may be part of a file system 360. Database 540 may access ML models in ML models 121 to train the model at regular intervals. Database 540 supplies the trained ML models determined using ML models to in-memory cache 530 to be managed by model cache 531. The accessed ML models residing in database 540 and in-memory cache 530 may be utilized by both online ranking service 510 and other services that are part of entity resolution system 100.

Figure 6:
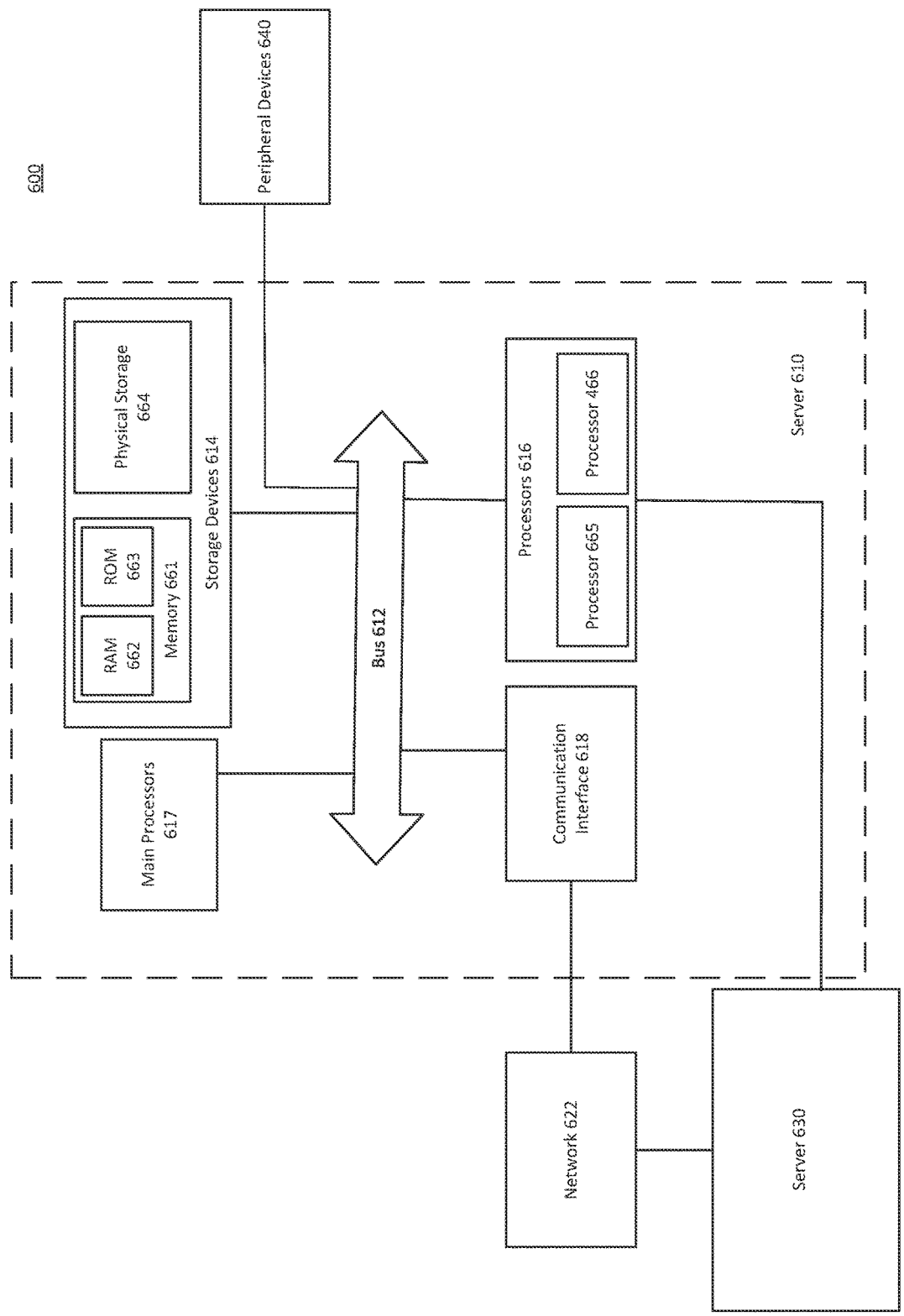
FIG. 6 illustrates a schematic diagram of an exemplary server of a distributed system, according to some embodiments of the present disclosure.

FIG. 6 illustrates a schematic diagram of an exemplary server of a distributed system, according to some embodiments of the present disclosure. According to FIG. 6, server 610 of distributed computing system 600 comprises a bus 612 or other communication mechanisms for communicating information, one or more processors 416 communicatively coupled with bus 612 for processing information, and one or more main processors 617 communicatively coupled with bus 612 for processing information. Processors 616 can be, for example, one or more microprocessors. In some embodiments, one or more processors 616 comprises processor 665 and processor 666, and processor 665 and processor 666 are connected via an inter-chip interconnect of an interconnect topology. Main processors 617 can be, for example, central processing units ("CPUs").

Server 610 can transmit data to or communicate with another server 630 through a network 622. Network 622 can be a local network, an internet service provider, Internet, or any combination thereof. Communication interface 618 of server 610 is connected to network 622, which can enable communication with server 630. In addition, server 610 can be coupled via bus 612 to peripheral devices 640, which comprises displays (e.g., cathode ray tube (CRT), liquid crystal display (LCD), touch screen, etc.) and input devices (e.g., keyboard, mouse, soft keypad, etc.).

Server 610 can be implemented using customized hard-wired logic, one or more ASICs or FPGAs, firmware, or program logic that in combination with the server causes server 410 to be a special-purpose machine.

Server 610 further comprises storage devices 614, which may include memory 461 and physical storage 664 (e.g., hard drive, solid-state drive, etc.). Memory 661 may include random access memory (RAM) 662 and read-only memory (ROM) 663. Storage devices 614 can be communicatively coupled with processors 616 and main processors 617 via bus 412. Storage devices 614 may include a main memory, which can be used for storing temporary variables or other intermediate information during execution of instructions to be executed by processors 616 and main processors 617. Such instructions, after being stored in non-transitory storage media accessible to processors 616 and main processors 617, render server 610 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 616 or main processors 617 for execution. For example, the instructions can initially be carried out on a magnetic disk or solid-state drive of a remote computer. The remote computer can load the instructions into its dynamic memory and send the instructions over a telephone line using a modem. A modem local to server 610 can receive the data on the telephone line and use an infra-red transmitter to convert the data to an infra-red signal. An infra-red detector can receive the data carried in the infra-red signal, and appropriate circuitry can place the data on bus 612. Bus 612 carries the data to the main memory within storage devices 614, from which processors 616 or main processors 617 retrieves and executes the instructions.

Entity resolution system 100 (as shown in FIG. 1) or one or more of its components may reside on either server 610 or 630 and may be executed by processors 616 or 617. Activity log system 400 or recommendation engine 500 (as shown in FIG. 5) or one or more of their components may also reside on either server 610 or 630. In some embodiments, the components of entity resolution system 100, recommendation engine 500, and/or activity log system 400 may be spread across multiple servers 610 and 630. For example, entity resolution toolkit 110 components 111-113 may be executed on multiple servers. Similarly, online ranking service instances 511-514 may be maintained by multiple servers 610 and 630.

Figure 7:
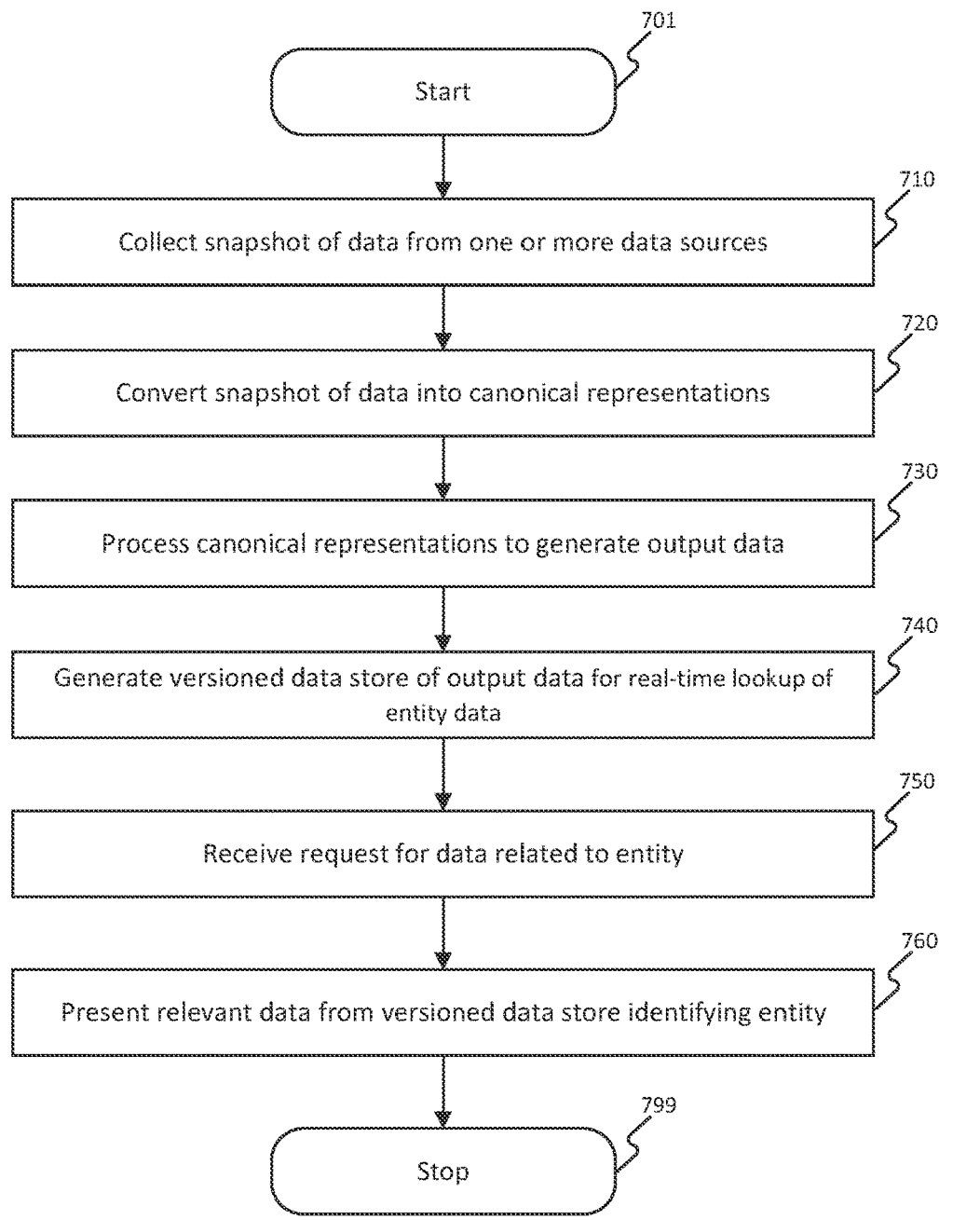
FIG. 7 is a flowchart showing an exemplary method for retrieving entity instances, according to some embodiments of the present disclosure.

FIG. 7 is a flowchart showing an exemplary method for retrieving entity instances, according to some embodiments of the present disclosure. The steps of method 700 may be performed by, for example, entity resolution system 100 of FIG. 1 executing on or otherwise using the features of distributed computing system 600 of FIG. 6 for purposes of illustration. It is appreciated that the illustrated method 700 can be altered to modify the order of steps and to include additional steps.

In step 710, entity resolution system 100 may extract snapshot of data (e.g., input data 160 of FIG. 1) from one or more data sources (e.g., data sources 150 of FIG. 1). Entity resolution system 100 may receive snapshot of input data 160 over network 190. Entity resolution system 100 may store received input data 160 in system database 120 as activities 122 (as shown in FIG. 1). In some embodiments, entity resolution system 100 may conduct cleanup of the input data 160 (as described in FIG. 1 above) before storing it in activities 122.

In step 720, entity resolution system 100 may convert snapshot of data into canonical representations using canonical module 113 (as shown in FIG. 1). Entity resolution system 100 may store canonical representations of activities 122 in entity repository 140 (as shown in FIG. 1) as shallow entity instances 141 (as shown in FIG. 1). Entity resolution system 100 may use entity definitions 123 (as shown in FIG. 1) to identify entities in records in snapshot of data and generate shallow entity instances 141. In some embodiments, entity resolution system 100 may parse configuration file 170 (as shown in FIG. 1) to determine entity definitions in real-time.

In step 730, entity resolution system 100 may process canonical representation of data to generate output data using various components of data factory module 111 (as shown in FIG. 1). Entity resolution system 100 may generate deep entity instances (e.g., deep entity instances 142 of FIG. 1) as part of the process to generate output data. Entity resolution system 100 may generate deep entity instances 142 by coalescing shallow entity instances 141 generated in step 720.

Entity resolution system 100 may identify data elements of records in input data 160 that can be coarse and fine entity identifiers to determine the level of evidence of relationship between entity instances (e.g., shallow entity instances 141). Entity resolution system 100 may use linker module 114 (as shown in FIG. 1) to determine level of evidence available for relationship between entity instances. Entity resolution system 100 may request linker module 114 to determine coarse and fine entity identifiers using entity definitions 123. In some embodiments, linker module 114 may employ Machine Learning (ML) models in ML models 121 (as shown in FIG. 1) to identify levels of evidence of relationship. Entity resolution system 100 may use fine entity identifiers indicating strong level of evidence of relationship to generate deep entity instances (e.g., deep entity instances 142). Enrichment module 115 may generate deep entity instances by linking the shallow entity instances of shallow entity instances 141 with the identified fine entity identifiers identified by linker module 114.

In step 740, entity resolution system 100 may generate versioned data store (e.g., versioned datasets 144 of FIG. 1) of output data using projector module 116 for real-time lookup of entity data. Entity resolution system 100 may generate versioned dataset of versioned datasets 144 using projector module 116. Projector module 116 may generate versioned dataset (e.g., versioned dataset 344 of FIG. 3) by connecting entity instances (e.g., shallow entity instances 341-343 of FIG. 3). A detailed description of generation of versioned dataset is presented in FIG. 3 description above.

In step 750, entity resolution system 100 may receive entity data request to find all information about the entity, such as longitudinal history. Entity resolution system 100 may engage API server 117 (as shown in FIG. 1) to expose endpoints to receive requests for retrieving entity data. Entity resolution system 100 may receive granularity level indicating level of requested evidence of relationship between entity instances. Entity resolution system 100 may also receive version information to look up the appropriate version datasets (e.g., version datasets 144 of FIG. 1) to retrieve requested entity data. Entity resolution system 100 may also receive entity identification information in the form of data elements of an entity.

In step 760, entity resolution system 100 may present relevant data from versioned data store (e.g., versioned datasets 144) associated with entity identified by input data request. In order to present relevant data, entity resolution system 100 may determine identifiable entity instances (e.g., shallow entity instances 141 and deep entity instances 142) using version information along with the entity identification information. Entity resolution system 100 may identify fine and coarse entity identifiers based on the level of requested evidence of relationship between entity instances. Entity resolution system 100 uses the requested level of evidence entity identifiers along with version number to identify relevant entity data. Entity resolution system 100 may present relevant information found about the requested entity. A detailed description of ways of relevant data presentation is described in FIG. 9 description below. Entity resolution system 100, upon completion of step 760, completes (step 799) executing method 700 on distributed computing system 600.

Figure 8:
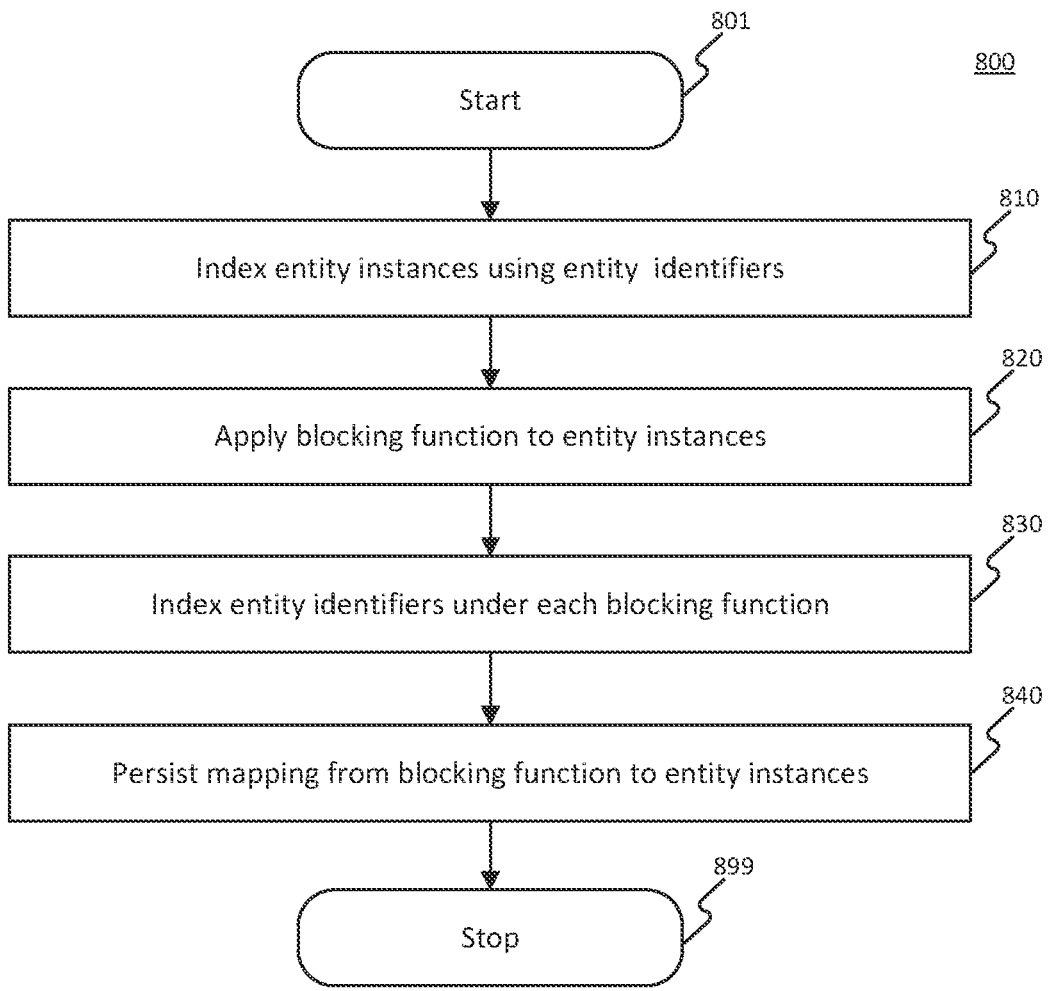
FIG. 8 is a flowchart showing an exemplary method for generating high-quality linked entities, according to some embodiments of the present disclosure.

FIG. 8 is a flowchart showing an exemplary method for generating high-quality linked entities, according to some embodiments of the present disclosure. The steps of method 800 may be performed by, for example, entity resolution system 100 of FIG. 1 executing on or otherwise using the features of distributed computing system 600 of FIG. 6 for purposes of illustration. It is appreciated that the illustrated method 800 can be altered to modify the order of steps and to include additional steps.

In step 810, entity resolution system 100 may index entity instances, such as shallow entity instances 141, deep entity instances, under coarse and fine identifiers, respectively. The coarse and fine entity identifiers used for indexing entity instances show weak and strong levels of evidence of relationship between entities.

In step 820, entity resolution system 100 may use blocking functions (e.g., blocking functions 118) to generate blocking key values (such as strings "foo" and "qux" shown in FIG. 3) to map entity instances to blocking key values. Entity resolution system 100 may use projector module 116 to generate blocking key values as strings by applying blocking function of blocking functions 118 to entity instances (e.g., shallow entity instances 341-343 of FIG. 3). Blocking function may process the entire data object representing entity instance or certain data elements to generate blocking key value. For example, in a healthcare setting, blocking function may be a partial function that computes the patient ID of a shallow patient type entity instance by concatenating first name, last name, and SSN values into a string.

In step 830, entity resolution system 100 may index entity identifiers, such coarse and fine identifiers under each blocking function. Entity resolution system 100 may index by generating mapping tables (e.g., mapping tables 345-347 of FIG. 3) with blocking function key and version number as an index to each mapping table. Entity resolution system 100 may generate a blocking function key (e.g., "blockingKey1" of FIG. 3) using blocking function signature of function name and parameters converted to a string. Entity resolution system 100 may obtain version number from the version attribute value included by linker module 114 when generating deep entity instances 142 (as shown in FIG. 1). Entity resolution system 100 may include in the indexed mapping tables 345-347 blocking key value to entity identifiers (e.g., "foo □ abc123"). Entity resolution system 100 may generate blocking key value by applying blocking function of blocking functions 118 to entity instances (e.g., shallow entity instances 341-343 of FIG. 3).

In step 840, entity resolution system 100 may persist the mapping from blocking functions to entity instances. Entity resolution system 100 may persist the mapping by storing mapping tables (e.g., mapping tables 345-347) and entity specific tables (e.g., versioned dataset 344 of FIG. 3) to create a mapping between blocking functions and entity instances. Entity resolution system 100 may generate entity specific table by grouping a set of entity identifiers and the entity instances identified by the identifiers generated during a data factory run. Entity resolution system 100, upon completion of step 840, completes (step 899) executing method 700 on distributed computing system 600.

Figure 9:
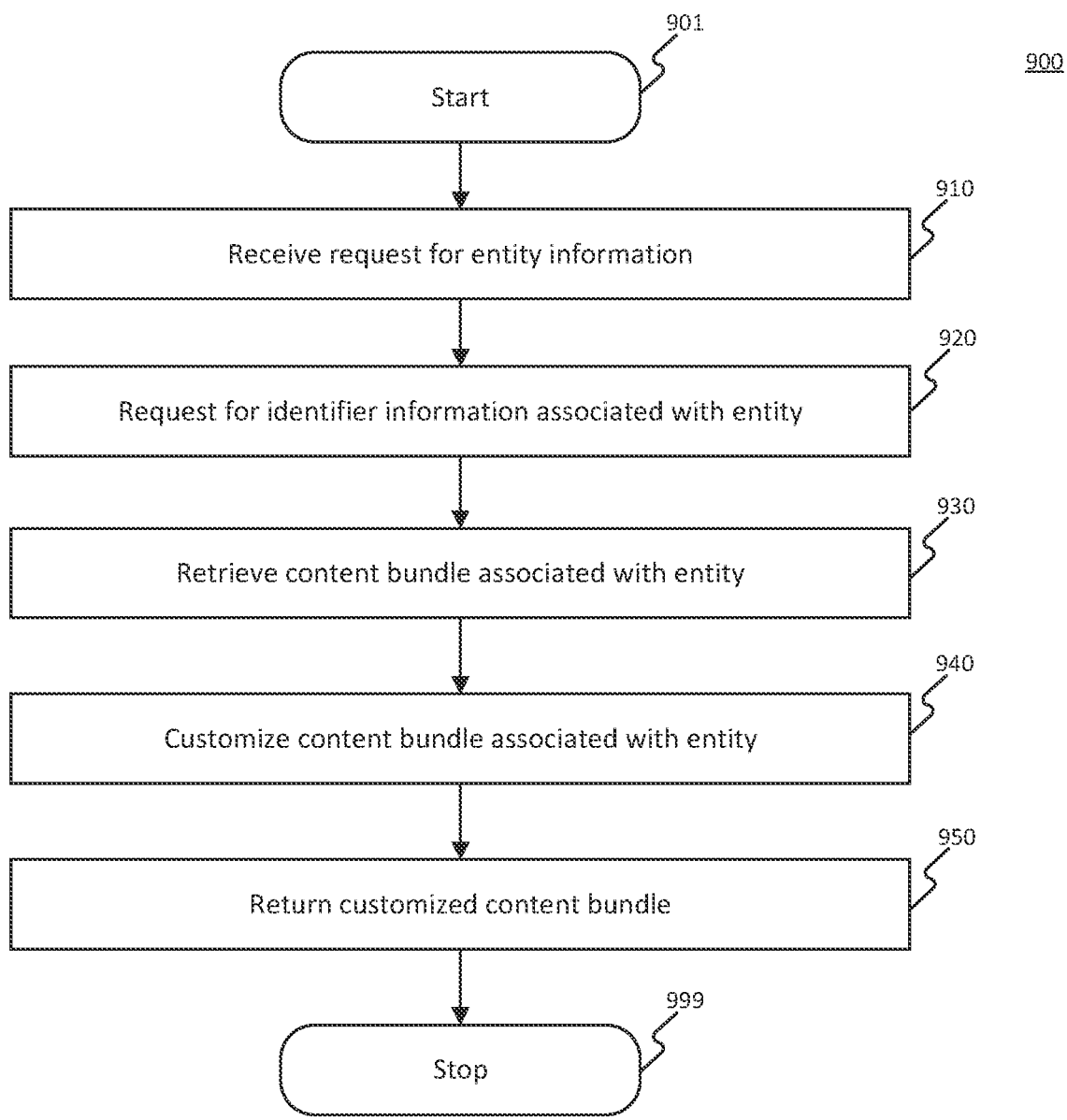
FIG. 9 is a flowchart showing an exemplary method for handling requests for retrieving entity information, according to some embodiments of the present disclosure.

FIG. 9 is a flowchart showing an exemplary method for handling requests for retrieving entity information, according to some embodiments of the present disclosure. The steps of method 900 may be performed by, for example, entity resolution system 100 of FIG. 1 executing on or otherwise using the features of distributed computing system 600 of FIG. 6 for purposes of illustration. It is appreciated that the illustrated method 900 can be altered to modify the order of steps and to include additional steps.

In step 910, entity resolution system 100 may receive requests for content associated with an entity. Entity resolution system 100 may receive entity information request from applications (e.g., application 450 of FIG. 4). Entity resolution system 100 may receive entity information requests at endpoints registered by API server 117 (As shown in FIG. 1). Entity resolution system 100 may receive entity identification information (e.g., entity identifiers 351-353 of FIG. 3) to identify entity instances (e.g., shallow entity instances 141, deep entity instances 142 of FIG. 1, and shallow entity instances 341-343 of FIG. 3) to retrieve requested content. Entity resolution system 100 may receive an entity identifier to uniquely identify an entity in entity instances (e.g., shallow entity instances 141, deep entity instances 142 of FIG. 1). In some embodiments, entity resolution system 100 may receive entity identity information that may uniquely identify entity instances obtained from a subset of data sources. In some embodiments, entity resolution system 100 may receive entity identification information in the form of a set of data elements of a record from input data 160 (as shown in FIG. 1) used to generate entity instances. Entity resolution system 100 may include identification in the form of entity identifiers, such as coarse (e.g., entity identifiers 351-353 of FIG. 3) and fine entity identifiers in the shallow and deep entity instances. In some embodiments, entity resolution system 100 may receive entity identification information in the form of shallow entity instances (e.g., shallow entity instances 341-343 of FIG. 3).

In step 920, entity resolution system 100 may generate a request for entity identifier associated with the requested entity. Entity resolution system 100 may use entity identification information provided as part of entity information request (from step 910) to generate entity identifier. Entity resolution system 100 may need to transform entity identification information to entity identifier to retrieve entity instances from entity repository 140 (as shown in FIG. 1). A detailed description of a method of transformation of entity identification information to entity identifier is presented in FIG. 10 description below.

In step 930, entity resolution system 100 may generate a request for content bundle using entity identifier determined in step 920. Entity resolution system 100 may review shallow entity instances 141 and deep entity instances 142 in entity repository 140 to determine relevant entity information to include in content bundle. Entity resolution system 100 may generate content bundle by including entity instances identified to match the generated entity identifier in step 920.

In step 940, entity resolution system 100 may customize content bundle generated in step 930 and return as a response to requested entity information. Entity resolution system 100 may customize content bundle by filtering content bundle data using requested entity information. Entity resolution system 100 may filter entities by determining the level of evidence of relationship needed between entities to be included in the content bundle. In some embodiments, entity resolution system 100 may customize content bundle based on client application making entity information request. For example, in a healthcare setting, an application presenting healthcare claim history of a patient may only include in content bundle entity instances with strong level of evidence matching the patient entity to avoid violating HIPAA regulations. Thus, entity resolution system 100 may only select deep entity instances 142 associated with fine entity identifiers to be present in customized content bundle. In another scenario, a different application requesting entity information for evaluating outcome of certain procedures may include entity instances of patient entities with even weak level evidence. It is done in that manner to have a large enough dataset of entity instances and not miss out on any of them due to unnecessary false negatives. Thus, in the second scenario, entity resolution system 100 may select entity instances based on both coarse and fine entity identifiers to be included in customized content bundle.

In some embodiments, entity resolution system 100 may customize content bundle by adding additional entity instances. Entity resolution system 100 may add additional resources by including other entity instances related to entity instances identified in step 930. For instance, entity resolution system 100 may include additional entity instances with weak level of evidence of relation to each of the entity instances identified in step 930. Entity resolution system 100 may include additional entity instances to provide a larger dataset of entity instances as may be needed for analysis of the collective information in custom bundle of entity instances. In some embodiments, additional entity instances by identifying latent information based on relationship between entity instances identified in step 930. In some embodiments, entity instances based on latent information may be generated and saved to entity repository 140 as either shallow entity instances 141 or deep entity instances 142. Entity instances based on latent information may be generated by data factory module 111 when generating output data.

In step 950, entity resolution system 100 may return customized content bundle. Entity resolution system 100 may return customized content bundle over network 190 (as shown in FIG. 1). In some embodiments, entity resolution system 100 may paginate customized content bundle and send a subset of entity instances to application making the request. Entity resolution system 100, upon completion of step 950, completes (step 999) executing method 900 on distributed computing system 600.

Figure 10:
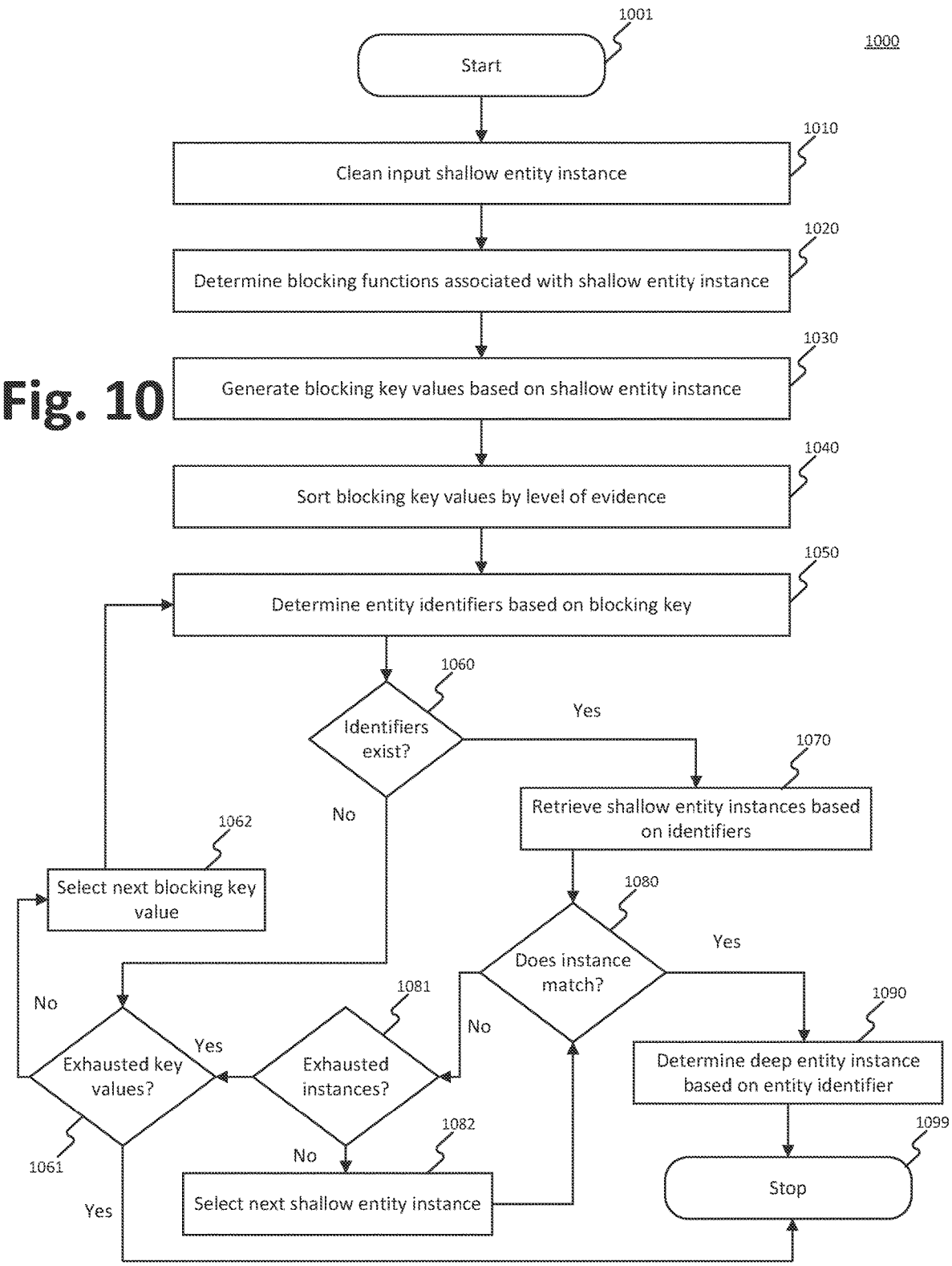
FIG. 10 is a flowchart showing an exemplary method for identifying entities based on insufficient lookup information, according to some embodiments of the present disclosure.

FIG. 10 is a flowchart showing an exemplary method for identifying entities based on insufficient lookup information, according to some embodiments of the present disclosure. The steps of method 1000 may be performed by, for example, API server 117 of FIG. 1 executing on or otherwise using the features of distributed computing system 600 of FIG. 6 for purposes of illustration. It is appreciated that the illustrated method 1000 can be altered to modify the order of steps and to include additional steps.

In step 1010, API server 117 may receive a shallow entity instance (e.g., shallow entity instances 341-343 of FIG. 3) requesting entity information associated with requested shallow entity instances. API server 117 may begin the entity information retrieval process by cleaning input shallow entity instance and conduct a match for deep entity instances in deep entity instances 142 (As shown in FIG. 1). API server 117 may clean shallow entity instance using standardized components of data factory module 111 that may have been used to transform snapshot of input data 160 to generate output data (e.g., deep entity instances 142).

In step 1020, API server 117 may determine one or more blocking functions of blocking functions 118 (as shown in FIG. 1) that may be applied by projector module 116 (as shown in FIG. 1) to shallow entity instances (e.g., shallow entity instances 341-343 of FIG. 3) to construct tables mapping blocking key values to entity instances (e.g., mapping tables 345-347 and versioned dataset 344 of FIG. 3). API server 117 may select one or more blocking functions of blocking functions 118 that were applied by projector module 116 to create mapping tables (e.g., mapping tables 345-347). After determining the one or more blocking functions of blocking functions 118, API server 117 may apply the one or more determined blocking functions to cleaned shallow entity instance from step 1010.

In step 1030, API server 117 may generate blocking key values based on shallow entity instances. Blocking key values may be generated by applying blocking functions identified in step 1020 to cleaned shallow entity instances. Blocking functions may generate alphanumeric strings as blocking key values by stringifying cleaned shallow entity instances. API server 117 may produce a collection of blocking function key-value mappings 361-363 based on the cleaned shallow entity instance (e.g., shallow entity instance 341). In some embodiments, blocking functions 118 may process data elements in cleaned shallow entity instances to generate strings of blocking key values. Blocking key(s) may be string representations of one or more blocking functions of blocking functions 118. In some embodiments, signatures of the one or more blocking functions of blocking functions 118 may be used as blocking function key(s) (e.g., "blockingKey1," "blockingKey2," and "blockingKey3" of FIG. 3).

In step 1040, API server 117 may sort the constructed blocking key values in descending order from strongest to weakest key value to find a match to the shallow entity instance. API server 117 may determine the strength of the blocking key values based on the strength of the entity identifiers associated with entity instances. API server 117 may use ML models 131 (as shown in FIG. 1) or other evidence notations present in entity definitions 123 (as shown in FIG. 1) to determine the strength of entity identifiers.

In step 1050, API server 117 may determine entity identifiers based on blocking key. API server 117 may receive blocking key and version number used to index mapping tables (e.g., mapping tables 345-347 of FIG. 3) of blocking key values. API server 117 may review mapping tables to determine entity identifiers for matched blocking function key. For example, if API server 117 receives "blockingKey1" along with "version 1" as blocking key and version identifier, then API server 117 retrieves blocking key values in mapping table 345.

In step 1060, API server 117 may check if entity identifiers exist for a given blocking function key and version identifier. For example, if "blockingKey1" (as shown in FIG. 3) and version 1 (as shown in FIG. 3) are provided as blocking function key and version information, then mapping table 345 matches the provided information, and entity identifiers "abc123" and "xyz456" are considered as entity identifiers. If the answer to the question in step 1060 is Yes, i.e., API server 117 found a mapping table, then method 1000 may jump to step 1070.

If the answer to the question in step 1060 is No, i.e., there are no matching tables indexed by blocking function key and version information provided in the entity information request sent to API server 117, then method 1000 may continue to step 1061.

In step 1061, API server 117 may check if there any more blocking key values to utilize to determine entity identifiers and, in turn, entity information. API server 117 may loop through each blocking key value mapping to entity identifier to conduct match between cleaned shallow entity instance from step 1010 and entity instance identified using entity identifier. If the answer to the question in step 1061 is Yes, i.e., all blocking key values have been exhausted, then API server 117 may return an empty collection to the client. Upon completion of step 1061, method 1000 may jump to step 1099, and API server 117 complete the execution of method 1000.

If the answer to the question in step 1061 is No, i.e., blocking key values have not been exhausted, then method 1000 may continue step 1062. In step 1062, API server 117 may select next blocking key value based on the sorted list of blocking key values. Method 1000 upon selection of next blocking key value may jump back to step 1050.

In step 1070 after it has been determined that entity identifiers exist at step 1060, API server 117 may retrieve shallow entity instances (e.g., shallow entity instances 341-343) based on identifiers. For example, entity identifiers "abc123," "xyz456" (as shown in FIG. 3) may be used to retrieve shallow entity instances present in versioned dataset 344 (as shown in FIG. 3).

In step 1080, API server 117 may match a cleaned shallow entity instance from step 1010 to shallow entity instances identified in step 1070. API server 117 may determine a match by checking if there is a relationship between cleaned shallow entity instance and shallow entity instances in versioned dataset 344. API server 117 may use linker module 114 to determine the relationship between identified shallow entity instances and the input shallow entity instance. API server 117 may use linker module 114 to determine the match. If the answer to the question in step 1080 is Yes, i.e., there is a match found, then method 1000 jumps to step 1090.

If the answer to the question in step 1080 is No, then method 1000 may continue to step 1081. In step 1081, API server 117 may check whether API server 117 exhausted matching all entity instances present in versioned dataset (e.g., versioned dataset 344). For example, if the entity identifier was "abc123," in FIG. 3, then it may map to shallow entity instances 341 and 342. If API server 117 fails to find a match between entity identifier of cleaned shallow entity instance of step 1010 and shallow entity instance 341, then it may review shallow entity instance 342 for a match. If the answer to the question in step 1081 is Yes, i.e., there are no other entity instances available for the entity identifier from step 1070, then method 1000 may jump back to step 1061.

In step 1082, API server 117 may select the next shallow entity instance matching entity identifier (e.g., shallow entity instance 342). After selection, method 1000 may jump back to step 1080 to check for a match between the newly selected shallow entity instance and cleaned shallow entity instance from step 1070.

If the answer to the question in step 1080 is Yes, i.e., an identified shallow entity instance from step 1070 matches the cleaned shallow entity instance, then method 1000 may continue to step 1090. If an identified shallow entity instance from step 1070 matches the cleaned shallow entity instance from 1010, then their corresponding entity identifier value may be used as the entity identifier to identify the deep entity instances in deep entity instances 142. In step 1090, API server 117 may attempt to retrieve deep entity instances of deep entity instances 142 that may match the entity identifier of the matching shallow entity match from step 1080. In some embodiments, API server 117 may search deep entity instances 142 only if the granularity variable is set to "fine" in the entity information request sent to API server 117. API server 117, upon completion of step 1090, completes (step 1099) executing method 1000 on distributed computing system 1000.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable medium including instructions that are executable by one or more processors to cause a system to perform operations for linking multiple data entities, the operations comprising:
   indexing entity instances;
   mapping the entity instances to blocking key values by applying blocking functions;
   generating versioned datasets for the entity instances;
   identifying levels of evidence of relationship between the entity instances using a machine learning model and the versioned datasets;
   indexing entity identifiers under the blocking functions by generating mapping tables, for updating the levels of evidence of relationship between the entity instances; and
   persisting one or more mappings in the mapping tables to the entity instances based on the levels of evidence of relationship.

2. The non-transitory computer readable medium of claim 1, wherein the entity instances comprise one or more shallow entity instances, wherein the shallow entity instances comprise a plurality of vector fields mapping to at most one data element.

3. The non-transitory computer readable medium of claim 2, wherein the entity instances further comprise deep entity instances generated by coalescing a plurality of the shallow entity instances identified by coarse and fine identifiers.

4. The non-transitory computer readable medium of claim 1, wherein the blocking key values are generated by stringifying the entity instances.

5. The non-transitory computer readable medium of claim 1, wherein indexing the entity identifiers under the blocking functions comprise: using a blocking function key and a version number as an index to the mapping tables.

6. The non-transitory computer readable medium of claim 1, wherein the operations further comprise:
   generating entity specific tables by grouping a set of the entity identifiers and the entity instances identified by the entity identifiers.

7. The non-transitory computer readable medium of claim 6, wherein persisting the one or more mappings in the mapping tables to the entity instances comprises:
storing the mapping tables and the entity specific tables to create a mapping between the blocking functions and the entity instances.

8. A method for linking multiple data entities, the method performed by one or more processors and comprising:
indexing entity instances;
mapping the entity instances to blocking key values by applying blocking functions;
generating versioned datasets for the entity instances;
identifying levels of evidence of relationship between the entity instances using a machine learning model and the versioned datasets;
indexing entity identifiers under the blocking functions by generating mapping tables, for updating the levels of evidence of relationship between the entity instances; and
persisting one or more mappings in the mapping table to the entity instances based on the levels of evidence of relationship.

9. The method of claim 8, wherein the entity instances comprise one or more shallow entity instances, wherein the shallow entity instances comprise a plurality of vector fields mapping to at most one data element.

10. The method of claim 9, wherein the entity instances further comprise deep entity instances generated by coalescing a plurality of the shallow entity instances identified by coarse and fine identifiers.

11. The method of claim 8, wherein the blocking key values are generated by stringifying the entity instances.

12. The method of claim 8, wherein indexing the entity identifiers under the blocking functions comprise: using a blocking function key and a version number as an index to the mapping tables.

13. The method of claim 8, further comprising:
generating entity specific tables by grouping a set of the entity identifiers and the entity instances identified by the entity identifiers.

14. The method of claim 13, wherein persisting the one or more mappings in the mapping tables to the entity instances comprises:
storing the mapping tables and the entity specific tables to create a mapping between the blocking functions and the entity instances.

15. A computer-implemented system for linking multiple data entities, the system comprising:
at least one non-transitory computer-readable medium configured to store instructions; and
at least one processor configured to execute the instructions to cause the system to perform operations comprising:
indexing entity instances;
mapping the entity instances to blocking key values by applying blocking functions;
generating versioned datasets for the entity instances;
identifying levels of evidence of relationship between the entity instances using a machine learning model and the versioned datasets;
indexing entity identifiers under the blocking functions by generating mapping tables for updating the levels of evidence of relationship between the entity instances; and
persisting one or more mappings in the mapping table to the entity instances based on the levels of evidence of relationship.

16. The system of claim 15, wherein the entity instances comprise one or more shallow entity instances, wherein the shallow entity instances comprise a plurality of vector fields mapping to at most one data element.

17. The system of claim 15, wherein the blocking key values are generated by stringifying the entity instances.

18. The system of claim 15, wherein indexing the entity identifiers under the blocking functions comprise: using a blocking function key and a version number as an index to the mapping tables.

19. The system of claim 15, wherein the operations further comprise:
generating entity specific tables by grouping a set of the entity identifiers and the entity instances identified by the entity identifiers.

20. The system of claim 19, wherein persisting the one or more mappings in the mapping tables to the entity instances comprises:
storing the mapping tables and the entity specific tables to create a mapping between the blocking functions and the entity instances.

* * * * *